(12) United States Patent
Yamamoto et al.

(10) Patent No.: US 12,438,781 B2
(45) Date of Patent: Oct. 7, 2025

(54) MANAGEMENT DEVICE, INSPECTION METHOD, AND INSPECTION PROGRAM

(71) Applicants: Sumitomo Electric Industries, Ltd., Osaka (JP); Sumitomo Wiring Systems, Ltd., Yokkaichi (JP); Autonetworks Technologies, Ltd., Yokkaichi (JP); TOYOTA JIDOSHA KABUSHIKI KAISHA, Toyota (JP)

(72) Inventors: Yusuke Yamamoto, Osaka (JP); Hideyuki Tanaka, Osaka (JP); Tatsuya Izumi, Osaka (JP); Kenta Ogata, Osaka (JP); Takeshi Hagihara, Yokkaichi (JP); Hirofumi Urayama, Yokkaichi (JP); Darmawan Go, Yokkaichi (JP); Tomohiro Otsu, Yokkaichi (JP); Yoshitaka Kikuchi, Yokkaichi (JP); Hideki Goto, Toyota (JP); Yasuhiro Yamasaki, Toyota (JP); Takashi Yasuda, Toyota (JP)

(73) Assignees: SUMITOMO ELECTRIC INDUSTRIES, LTD., Osaka (JP); SUMITOMO WIRING SYSTEMS, LTD., Yokkaichi (JP); AUTONETWORKS TECHNOLOGIES, LTD., Yokkaichi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/292,951

(22) PCT Filed: May 19, 2022

(86) PCT No.: PCT/JP2022/020795
§ 371 (c)(1),
(2) Date: Jan. 29, 2024

(87) PCT Pub. No.: WO2023/007914
PCT Pub. Date: Feb. 2, 2023

(65) Prior Publication Data
US 2024/0333597 A1    Oct. 3, 2024

(30) Foreign Application Priority Data
Jul. 30, 2021    (JP) .................... 2021-125632

(51) Int. Cl.
*G06F 15/173* (2006.01)
*H04L 41/084* (2022.01)
*H04L 41/12* (2022.01)

(52) U.S. Cl.
CPC ............ *H04L 41/12* (2013.01); *H04L 41/084* (2013.01)

(58) Field of Classification Search
CPC ............................. H04L 41/12; H04L 41/084
See application file for complete search history.

(56) References Cited

U.S. PATENT DOCUMENTS

| | | |
|---|---|---|
| 2014/0122631 A1 | 5/2014 | Tahara et al. |
| 2015/0195152 A1 | 7/2015 | Shinohara et al. |

(Continued)

FOREIGN PATENT DOCUMENTS

| | | |
|---|---|---|
| JP | 2003-216220 A | 7/2003 |
| JP | 2010-268318 A | 11/2010 |

(Continued)

*Primary Examiner* — Joseph R Maniwang
(74) *Attorney, Agent, or Firm* — XSENSUS LLP

(57) ABSTRACT

A management device includes: a specification information acquisition unit configured to acquire specification information indicating a specification of a configuration of an in-vehicle network; a state information acquisition unit configured to acquire state information indicating an assem- (Continued)

bly state, in the in-vehicle network, of a plurality of in-vehicle devices forming the in-vehicle network; and a comparison unit configured to compare the specification indicated by the specification information acquired by the specification information acquisition unit with the assembly state indicated by the state information acquired by the state information acquisition unit.

20 Claims, 38 Drawing Sheets

(56) References Cited

U.S. PATENT DOCUMENTS

| | | | |
|---|---|---|---|
| 2016/0129958 A1* | 5/2016 | Byrnes | B62D 63/025 180/12 |
| 2016/0278017 A1 | 9/2016 | Koike | |
| 2020/0202638 A1* | 6/2020 | Sakurada | H04L 67/12 |
| 2020/0249930 A1 | 8/2020 | Abe | |
| 2022/0297568 A1* | 9/2022 | Kinomura | B60L 50/50 |
| 2024/0420522 A1* | 12/2024 | Woodford | H04L 43/0817 |

FOREIGN PATENT DOCUMENTS

| | | |
|---|---|---|
| JP | 2014-103622 A | 6/2014 |
| JP | 2016-178529 A | 10/2016 |
| JP | 2020-123253 A | 8/2020 |
| WO | 2012/124392 A1 | 9/2012 |
| WO | 2014/045366 A1 | 3/2014 |
| WO | 2019/225364 A1 | 11/2019 |

\* cited by examiner

FIG. 3

| DEVICE ID | DEVICE NAME | DEVICE TYPE | NUMBER OF COMMUNICATION PORTS | NUMBER OF APPLICATIONS |
|---|---|---|---|---|
| D001 | RELAY DEVICE 201A | IN-VEHICLE DEVICE FOR RELAY | 4 | 0 |
| D002 | RELAY DEVICE 201B | IN-VEHICLE DEVICE FOR RELAY | 4 | 0 |
| D003 | IN-VEHICLE ECU 111A | TERMINAL DEVICE | 1 | 1 |
| D004 | IN-VEHICLE ECU 111B | TERMINAL DEVICE | 1 | 1 |
| D005 | IN-VEHICLE ECU 111C | TERMINAL DEVICE | 1 | 1 |

FIG. 5

| DEVICE ID | CONNECTION PORT ID | ADJACENT NODE ID | ADJACENT CONNECTION PORT ID |
|---|---|---|---|
| D003 | P01 | D001 | P01 | tp1

FIG. 8

| DEVICE ID | CONNECTION PORT ID | ADJACENT NODE ID | ADJACENT CONNECTION PORT ID |
|---|---|---|---|
| D001 | P01 | D003 | P01 |
| | P02 | null | null |
| | P03 | D002 | P01 |
| | P04 | null | null | tp11

FIG. 9

| DEVICE ID | CONNECTION PORT ID | ADJACENT NODE ID | ADJACENT CONNECTION PORT ID |
|---|---|---|---|
| D002 | P01 | D001 | P03 |
| | P02 | D004 | P01 |
| | P03 | null | null |
| | P04 | D005 | P01 | tp12

FIG. 15

Stp1

| DEVICE ID | CONNECTION PORT ID | ADJACENT NODE ID | ADJACENT CONNECTION PORT ID |
|---|---|---|---|
| D001 | P01 | D003 | P01 |
| | P02 | null | null |
| | P03 | D002 | P01 |
| | P04 | null | null |
| D002 | P01 | D001 | P03 |
| | P02 | D004 | P01 |
| | P03 | null | null |
| | P04 | D005 | P01 |
| D003 | P01 | D001 | P01 |
| D004 | P01 | D002 | P02 |
| D005 | P01 | D002 | P04 |

FIG. 25

| DEVICE ID | DEVICE NAME | DEVICE TYPE | NUMBER OF COMMUNICATION PORTS | NUMBER OF APPLICATIONS |
|---|---|---|---|---|
| D001 | RELAY DEVICE 201A | IN-VEHICLE DEVICE FOR RELAY | 4 | 0 |
| D003 | IN-VEHICLE ECU 111A | TERMINAL DEVICE | 1 | 1 |
| D004 | IN-VEHICLE ECU 111B | TERMINAL DEVICE | 1 | 1 |
| D005 | IN-VEHICLE ECU 111C | TERMINAL DEVICE | 1 | 1 |

FIG. 28

| DEVICE ID | CONNECTION PORT ID | ADJACENT NODE ID | ADJACENT CONNECTION PORT ID |
|---|---|---|---|
| D001 | P01 | D003 | P01 |
| | P02 | D004 | P01 |
| | P03 | D005 | P01 |
| | P04 | null | null |
| D003 | P01 | D001 | P01 |
| D004 | P01 | D001 | P02 |
| D005 | P01 | D001 | P03 |

Stp2

MANAGEMENT DEVICE, INSPECTION METHOD, AND INSPECTION PROGRAM

CROSS-REFERENCE TO RELATED APPLICATIONS

This application is based on PCT filing PCT/JP2022/020795, filed May 19, 2022, which claims priority from Japanese Patent Application No. 2021-125632, filed Jul. 30, 2021, the entire contents of each are incorporated herein by reference.

TECHNICAL FIELD

The present disclosure relates to a management device, an inspection method, and an inspection program.

TECHNICAL FIELD

The present disclosure relates to a management device, an inspection method, and an inspection program.

This application claims priority on Japanese Patent Application No. 2021-125632 filed in Japan on Jul. 30, 2021, the entire contents of which are incorporated herein by reference.

BACKGROUND ART

PATENT LITERATURE 1 (Japanese Laid-Open Patent Publication No. 2003-216220) describes a method for manufacturing a vehicle as below. That is, the method for manufacturing a vehicle includes: a step of assembling, into a vehicle, a first control unit that retains identification information regarding a manufacturing specification of the vehicle; a step of assembling a second control unit into the vehicle, in a state of being able to communicate with the first control unit; and a step of setting a program to the second control unit, wherein when the setting of the program is performed, the second control unit acquires the identification information from the first control unit and verifies integrity of the program, based on the identification information.

CITATION LIST

Patent Literature

PATENT LITERATURE 1: Japanese Laid-Open Patent Publication No. 2003-216220

SUMMARY OF THE INVENTION

A management device of the present disclosure includes: a specification information acquisition unit configured to acquire specification information indicating a specification of a configuration of an in-vehicle network; a state information acquisition unit configured to acquire state information indicating an assembly state, in the in-vehicle network, of a plurality of in-vehicle devices forming the in-vehicle network; and a comparison unit configured to compare the specification indicated by the specification information acquired by the specification information acquisition unit with the assembly state indicated by the state information acquired by the state information acquisition unit.

An inspection method of the present disclosure is an inspection method for a vehicle to be performed in a management device. The inspection method includes: a step of acquiring specification information indicating a specification of a configuration of an in-vehicle network: a step of acquiring state information indicating an assembly state, in the in-vehicle network, of a plurality of in-vehicle devices forming the in-vehicle network; and a step of comparing the specification indicated by the acquired specification information with the assembly state indicated by the acquired state information.

An inspection program of the present disclosure is an inspection program to be used in a management device. The inspection program causes a computer to function as: a specification information acquisition unit configured to acquire specification information indicating a specification of a configuration of an in-vehicle network; a state information acquisition unit configured to acquire state information indicating an assembly state, in the in-vehicle network, of a plurality of in-vehicle devices forming the in-vehicle network; and a comparison unit configured to compare the specification indicated by the specification information acquired by the specification information acquisition unit with the assembly state indicated by the state information acquired by the state information acquisition unit.

An aspect of the present disclosure can be realized as a management device including such a characteristic processing unit, but also can be realized as a semiconductor integrated circuit that realizes a part or the entirety of the management device, or can be realized as an inspection system that includes the management device.

BRIEF DESCRIPTION OF DRAWINGS

FIG. 3 shows a configuration of each in-vehicle device in the in-vehicle system according to the embodiment of the present disclosure.

FIG. 5 shows an example of a topology information table created by an in-vehicle ECU in the in-vehicle system according to the embodiment of the present disclosure.

FIG. 8 shows an example of a topology information table created by a relay device in the in-vehicle system according to the embodiment of the present disclosure.

FIG. 9 shows an example of a topology information table created by a relay device in the in-vehicle system according to the embodiment of the present disclosure.

FIG. 15 shows an example of a topology specification table transmitted from a server to a relay device according to the embodiment of the present disclosure.

FIG. 25 shows a configuration of each in-vehicle device in the in-vehicle system according to the embodiment of the present disclosure.

FIG. 28 shows another example of the topology specification table transmitted from the server to a relay device according to the embodiment of the present disclosure.

DETAILED DESCRIPTION

Figure 1:
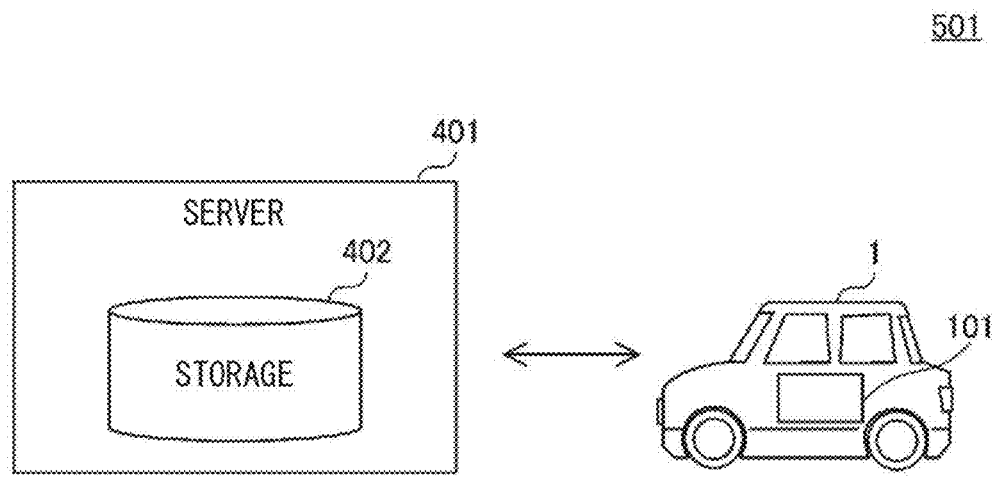
FIG. 1 shows an example of a configuration of an inspection system according to an embodiment of the present disclosure.

To date, there has been proposed a method in which inspection as to whether or not assembly of an in-vehicle device is appropriately performed is performed in a manufacturing step of a vehicle, for example.

Problems to be Solved by the Present Disclosure

However, with the technology described in PATENT LITERATURE 1, it is only possible to determine whether or not an appropriate program according to the manufacturing specification is written in the second control unit, and it is not possible to determine whether or not an appropriate in-vehicle network is configured by a plurality of in-vehicle devices.

The present disclosure has been made in order to solve the above problem. An object of the present disclosure is to provide a management device, an inspection method, and an inspection program capable of determining whether or not an appropriate in-vehicle network is configured by a plurality of in-vehicle devices assembled into a vehicle.

Effects of the Present Disclosure

According to the present disclosure, it is possible to determine whether or not an appropriate in-vehicle network is configured by a plurality of in-vehicle devices assembled into a vehicle.

Description of Embodiment of the Present Disclosure

First, contents of the embodiment of the present disclosure are listed and described.

(1) A management device according to the embodiment of the present disclosure includes: a specification information acquisition unit configured to acquire specification information indicating a specification of a configuration of an in-vehicle network; a state information acquisition unit configured to acquire state information indicating an assembly state, in the in-vehicle network, of a plurality of in-vehicle devices forming the in-vehicle network; and a comparison unit configured to compare the specification indicated by the specification information acquired by the specification information acquisition unit with the assembly state indicated by the state information acquired by the state information acquisition unit.

Thus, with the configuration in which the specification of the configuration of the in-vehicle network and the assembly state of the plurality of in-vehicle devices forming the in-vehicle network are compared with each other, when compared with a configuration in which whether or not the assembly state is appropriate is determined for each in-vehicle device, it is possible to determine whether or not the assembly state of the plurality of in-vehicle devices conforms to the specification of the configuration of the in-vehicle network. Therefore, it is possible to determine whether or not an appropriate in-vehicle network is configured by the plurality of in-vehicle devices assembled into the vehicle.

(2) The state information acquisition unit may acquire, as the state information, topology information indicating a topology of each in-vehicle device in the in-vehicle network.

With this configuration, it is possible to determine whether or not the topology of the in-vehicle devices assembled into the vehicle conforms to the specification of the configuration of the in-vehicle network.

(3) The state information acquisition unit may acquire, as the state information, software information indicating a plurality of combinations of the in-vehicle device and software mounted to the in-vehicle device.

With this configuration, it is possible to determine whether or not the plurality of combinations of the in-vehicle device assembled into the vehicle and the software conform to the specification of the configuration of the in-vehicle network.

(4) The specification information acquisition unit may acquire the specification information corresponding to an identifier for the in-vehicle network, from a server outside a vehicle to which the management device is mounted.

With this configuration, the specification information indicating the specification of the configuration of the in-vehicle network in the vehicle to which the management device is assembled can be more accurately acquired.

(5) The management device may further include a notification unit configured to perform a notification process of notifying a user of a comparison result between the specification and the assembly state by the comparison unit.

With this configuration, when the assembly state of the in-vehicle device does not conform to the specification of the configuration of the in-vehicle network, it is possible to urge the user to improve the assembly state of the in-vehicle device.

(6) When the assembly state does not match the specification, the notification unit may perform the notification process that allows recognition of the in-vehicle device, among the plurality of in-vehicle devices, in which the assembly state does not match the specification. With this configuration, it is possible to cause the user to recognize the in-vehicle device of which the assembly state should be improved. Therefore, the assembly state of the in-vehicle device can be effectively improved.

(7) The management device may be included in a relay device configured to relay information between the plurality of in-vehicle devices, and the state information acquisition unit may acquire the state information indicating the assembly state of a plurality of the in-vehicle devices connected to the relay device.

With this configuration, the assembly state for each in-vehicle device can be collected in a simple manner to create the state information.

(8) An inspection method according to the embodiment of the present disclosure is an inspection method for a vehicle to be performed in a management device. The inspection method includes: a step of acquiring specification information indicating a specification of a configuration of an in-vehicle network; a step of acquiring state information indicating an assembly state, in the in-vehicle network, of a plurality of in-vehicle devices forming the in-vehicle network; and a step of comparing the specification indicated by the acquired specification information with the assembly state indicated by the acquired state information.

Thus, with the method in which the specification of the configuration of the in-vehicle network and the assembly state of the plurality of in-vehicle devices forming the in-vehicle network are compared with each other, when compared with a configuration in which whether or not the assembly state is appropriate is determined for each in-vehicle device, it is possible to determine whether or not the assembly state of the plurality of in-vehicle devices conforms to the specification of the configuration of the in-vehicle network. Therefore, it is possible to determine whether or not an appropriate in-vehicle network is configured by the plurality of in-vehicle devices assembled into the vehicle.

(9) An inspection program according to the embodiment of the present disclosure is an inspection program to be used in a management device. The inspection program causes a computer to function as: a specification information acquisition unit configured to acquire specification information indicating a specification of a configuration of an in-vehicle network: a state information acquisition unit configured to acquire state information indicating an assembly state, in the in-vehicle network, of a plurality of in-vehicle devices forming the in-vehicle network; and a comparison unit configured to compare the specification indicated by the specification information acquired by the specification information acquisition unit with the assembly state indicated by the state information acquired by the state information acquisition unit.

Thus, with the configuration in which the specification of the configuration of the in-vehicle network and the assembly state of the plurality of in-vehicle devices forming the in-vehicle network are compared with each other, when compared with a configuration in which whether or not the assembly state is appropriate is determined for each in-vehicle device, it is possible to determine whether or not the assembly state of the plurality of in-vehicle devices conforms to the specification of the configuration of the in-vehicle network. Therefore, it is possible to determine whether or not an appropriate in-vehicle network is configured by the plurality of in-vehicle devices assembled into the vehicle.

Hereinafter, an embodiment of the present disclosure will be described with reference to the drawings. In the drawings, the same or corresponding parts are denoted by the same reference signs, and descriptions thereof are not repeated. At least some parts of the embodiments described below can be combined together as desired.

[Inspection System]

FIG. 1 shows an example of a configuration of an inspection system according to an embodiment of the present disclosure. With reference to FIG. 1, an inspection system 501 includes a server 401 and a management unit 101. The management unit 101 is mounted to a vehicle 1. The server 401 includes a storage 402.

[In-Vehicle System]

Figure 2:
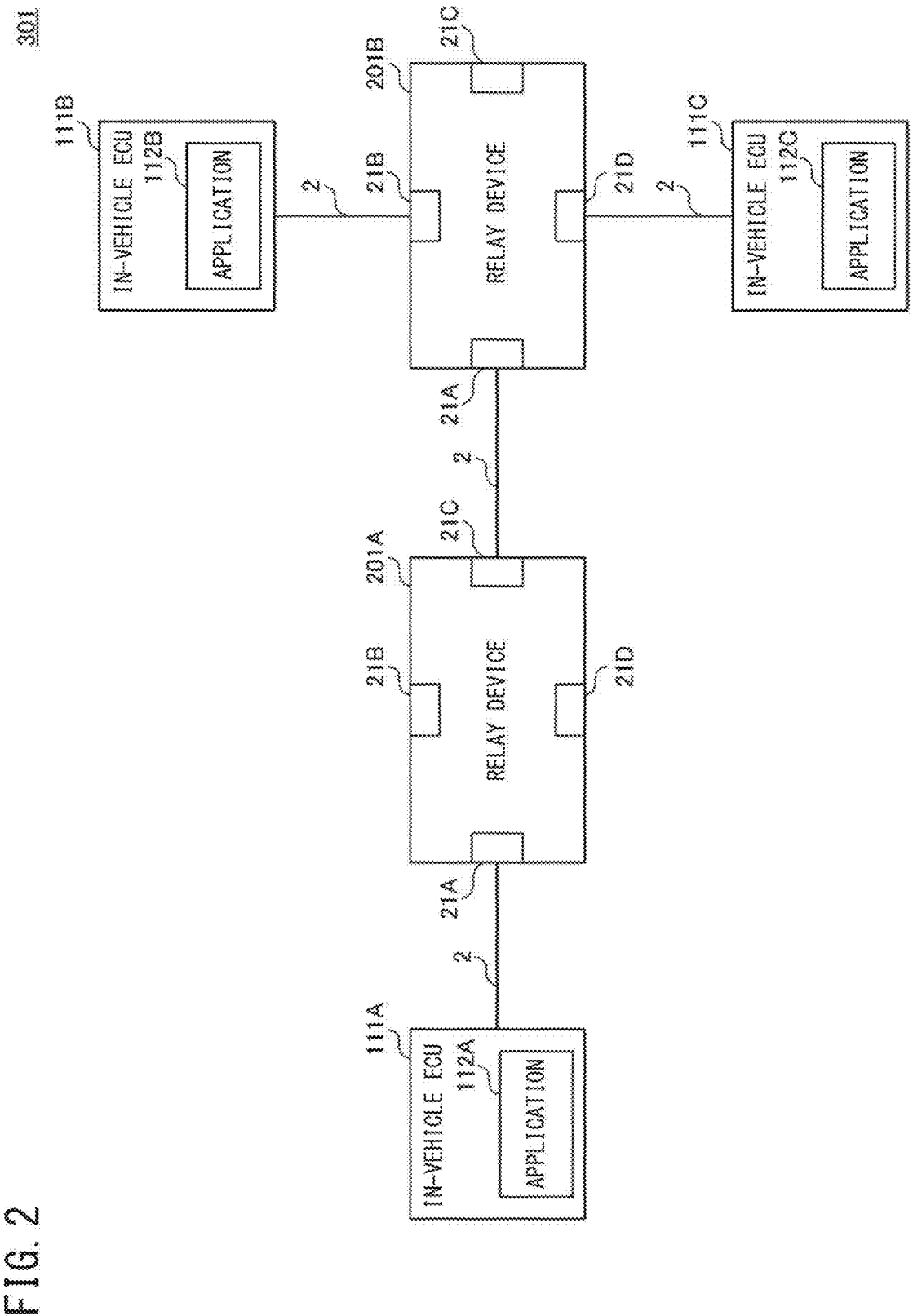
FIG. 2 shows an example of a configuration of an in-vehicle system according to the embodiment of the present disclosure.

FIG. 2 shows an example of a configuration of an in-vehicle system according to the embodiment of the present disclosure. FIG. 2 shows an in-vehicle system 301 manufactured by a plurality of in-vehicle devices being assembled into the vehicle 1 by the manufacturer of the vehicle 1.

FIG. 3 shows a configuration of each in-vehicle device in the in-vehicle system according to the embodiment of the present disclosure. As a configuration of each in-vehicle device in the in-vehicle system 301, FIG. 3 shows a device ID, a device name, a device type, the number of communication ports, and the number of applications of the in-vehicle device.

With reference to FIG. 2 and FIG. 3, the in-vehicle system 301 includes a relay device 201 and an in-vehicle ECU (Electronic Control Unit) 111. More specifically, the in-vehicle system 301 includes relay devices 201A, 201B as the relay device 201. The in-vehicle system 301 includes in-vehicle ECUs 111A, 111B, 111C as the in-vehicle ECU 111. The relay device 201 and the in-vehicle ECU 111 are examples of the in-vehicle device.

The relay device 201 includes communication ports 21A, 21B, 21C, 21D. Hereinafter, each of the communication ports 21A, 21B, 21C, 21D will also be referred to as a communication port 21. The relay device 201 need not necessarily include four communication ports 21 and may include two, three, five, or more communication ports 21.

The communication port 21 is a terminal to which a cable 2 can be connected. The cable 2 is a cable according to the standard of Ethernet (registered trademark), for example. The cable 2 may be a cable according to a standard such as CAN (Controller Area Network) (registered trademark), FlexRay (registered trademark), MOST (Media Oriented Systems Transport) (registered trademark), LIN (Local Interconnect Network), or the like.

The communication port 21C in the relay device 201A and the communication port 21A in the relay device 201B are connected to each other through the cable 2. The in-vehicle ECU 111A is connected to the communication port 21A in the relay device 201A through the cable 2. The in-vehicle ECU 111B is connected to the communication port 21B in the relay device 201B through the cable 2. The in-vehicle ECU 111C is connected to the communication port 21D in the relay device 201B through the cable 2. The relay device 201 relays information between a plurality of the in-vehicle ECUs 111. The relay device 201, the in-vehicle ECU 111, and the cable 2 form an in-vehicle network.

The in-vehicle ECU 111 includes an application 112. More specifically, as the application 112, the in-vehicle ECU 111A includes an application 112A, the in-vehicle ECU 111B includes an application 112B, and the in-vehicle ECU 111C includes an application 112C.

The manufacturer of the in-vehicle ECU 111 writes a program of the application 112 into a storage (not shown) in the in-vehicle ECU 111. For example, the in-vehicle ECU 111 having the program written in the storage thereof is assembled into the vehicle 1 by the manufacturer of the vehicle 1 in a manufacturing step of the vehicle 1. More specifically, the in-vehicle ECU 111 having the program written in the storage thereof is connected to the communication port 21 in the relay device 201 through the cable 2 by the manufacturer of the vehicle 1.

The in-vehicle ECU 111 may have the program written into the storage by the manufacturer of the vehicle 1, after being assembled into the vehicle 1 by the manufacturer of the vehicle 1, in the manufacturing step of the vehicle 1.

Problem

For example, due to human error in the manufacturing step of the vehicle 1, a certain in-vehicle ECU 111 may be connected to a relay device 201 different from the relay device 201 to which the in-vehicle ECU 111 should be connected, or a certain in-vehicle ECU 111 may be connected to a communication port 21 different from the communication port 21, in a relay device 201, to which the in-vehicle ECU 111 should be connected. In addition, in recent years, there is a tendency that development of the in-vehicle ECU 111 as hardware and development of the application 112 as software are separated, and there are cases where the in-vehicle ECUs 111 to which the same function should be implemented include applications 112 different from each other. Specifically, there are cases where, in the in-vehicle ECU 111, due to human error in the manufacturing step, for example, a program different from the program that should originally be written into a storage is written, whereby the in-vehicle ECU 111 includes an application 112 different from the application 112 that should originally be mounted.

In such a case, in the in-vehicle system 301, a relay process or the like of information between the in-vehicle ECUs 111 by the relay device 201 may fail to be appropriately performed.

Therefore, a technology capable of determining whether or not an appropriate in-vehicle network is configured by a plurality of in-vehicle devices assembled into the vehicle 1 is required. The relay device 201 according to the embodiment of the present disclosure solves the above-described problem with the configuration described below.

[Relay Device]

Figure 4:
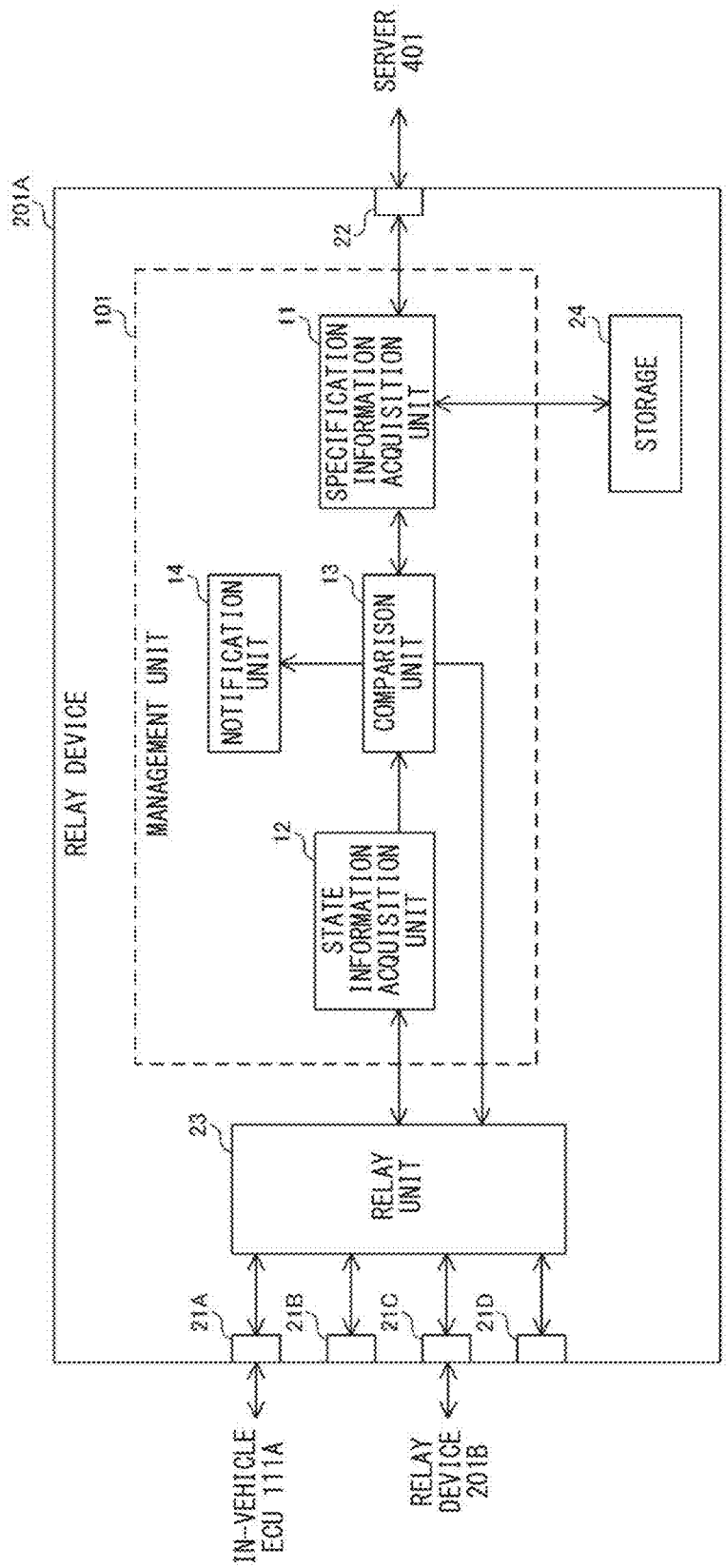
FIG. 4 shows an example of a configuration of a relay device according to the embodiment of the present disclosure.

FIG. 4 shows an example of a configuration of a relay device according to the embodiment of the present disclosure. FIG. 4 shows a configuration of the relay device 201A. With reference to FIG. 4, the relay device 201A includes: the communication ports 21A, 21B, 21C, 21D; an inspection port 22; a relay unit 23; a storage 24; and the management unit 101. The storage 24 is a nonvolatile memory, for example. The management unit 101 is an example of a management device. In the following, as shown in FIG. 4, description will be given assuming that the management unit 101 is included in the relay device 201A. However, the management unit 101 may be included in the relay device 201B, or may be included in both of the relay device 201A and the relay device 201B. The management unit 101 may be included in the in-vehicle ECU 111.

The relay unit 23 can relay information between a plurality of the in-vehicle ECUs 111. That is, the relay unit 23 can receive an Ethernet frame via a corresponding communication port 21 from an in-vehicle ECU 111 and relay the received Ethernet frame to a destination in-vehicle ECU 111.

[Management Unit]

The management unit 101 includes a specification information acquisition unit 11, a state information acquisition unit 12, a comparison unit 13, and a notification unit 14. For example, the manufacturer of the relay device 201A writes a program for the management unit 101 into the storage 24. The relay device 201 having the program written in the storage 24 is assembled into the vehicle 1 by the manufacturer of the vehicle 1 in the manufacturing step of the vehicle 1.

The specification information acquisition unit 11, the state information acquisition unit 12, the comparison unit 13, and the notification unit 14 are realized, for example, by a processor such as a CPU (Central Processing Unit) and a DSP (Digital Signal Processor) executing the program written in the storage 24.

For example, the manufacturer of the relay device 201A further writes a management number into the storage 24. The management number is an identifier, for an in-vehicle network, in which a different value is set for each configuration of the in-vehicle network that should be included in the vehicle 1. As an example, the manufacturer of the relay device 201A writes "CN01" as the management number into the storage 24.

<State Information Acquisition Unit>

The state information acquisition unit 12 acquires state information indicating the assembly state, in an in-vehicle network, of a plurality of in-vehicle devices forming the in-vehicle network. More specifically, the state information acquisition unit 12 acquires state information indicating the assembly state of the in-vehicle ECUs 111A, 111B, 111C and state information indicating the assembly state of the relay device 201B.

For example, the state information acquisition unit 12 acquires, as the state information, a topology integration table Ttp showing the topology of each in-vehicle device in the in-vehicle network. The topology integration table Ttp is an example of topology information.

For example, the state information acquisition unit 12 acquires, as the state information, an application integration table Tap showing a plurality of combinations of an in-vehicle device and software mounted to the in-vehicle device. The application integration table Tap is an example of software information.

More specifically, the state information acquisition unit 12 acquires a topology information table tp created in an in-vehicle device and showing a correspondence relationship between a device ID, a connection port ID, an adjacent node ID, and an adjacent connection port ID of the in-vehicle device. Here, the connection port ID is an identifier for a communication port in the in-vehicle device, the communication port having an adjacent node connected thereto. The adjacent node ID is the device ID of the adjacent node. The adjacent connection port ID is an identifier for a communication port in the adjacent node, the communication port having the in-vehicle device connected thereto. The state information acquisition unit 12 creates the topology integration table Ttp, based on the topology information table tp acquired from each in-vehicle device.

The state information acquisition unit 12 acquires an application information table ap created in an in-vehicle device and showing a correspondence relationship between a device ID of the in-vehicle device, an application ID being an identifier for an application 112 included in the in-vehicle device, and a version of the application 112. The state information acquisition unit 12 creates the application integration table Tap, based on the application information table ap acquired from each in-vehicle device.

(Creation of Topology Information Table)

An in-vehicle device performs communication with another in-vehicle device connected through the cable 2, thereby creating the topology information table tp showing a correspondence relationship between the device ID, the connection port ID, the adjacent node ID, and the adjacent connection port ID of the in-vehicle device.

With reference to FIG. 3 again, the device IDs of the relay device 201A, the relay device 201B, the in-vehicle ECU 111A, the in-vehicle ECU 111B, and the in-vehicle ECU 111C are assumed to be "D001", "D002", "D003", "D004", and "D005", respectively. In the following, the port ID of the communication port of the in-vehicle ECU 111 is assumed to be "P01". The connection port IDs of the communication port 21A, the communication port 21B, the communication port 21C, and the communication port 21D of the relay device 201 are assumed to be "P01", "P02", "P03", and "P04", respectively.

Figure 6:
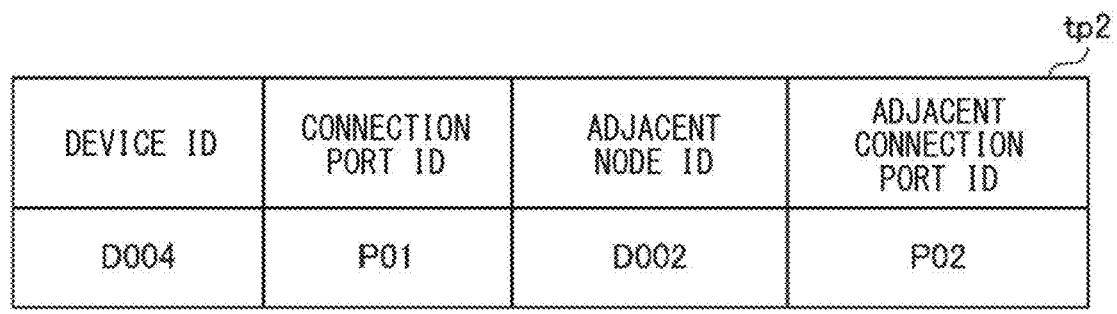
FIG. 6 shows an example of a topology information table created by an in-vehicle ECU in the in-vehicle system according to the embodiment of the present disclosure.
Figure 7:
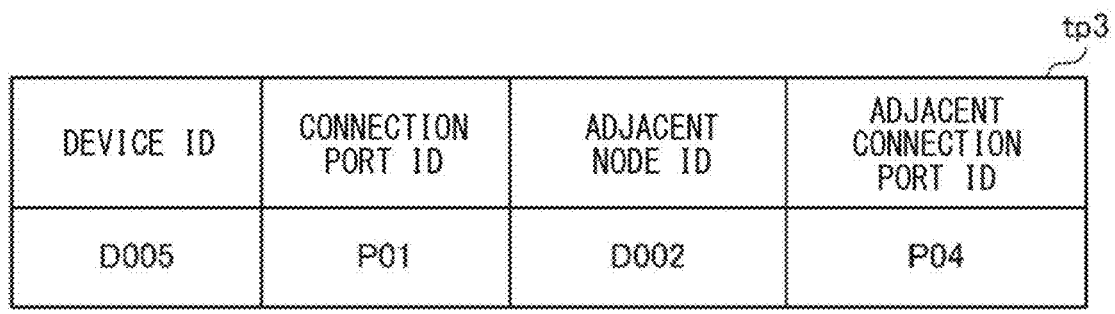
FIG. 7 shows an example of a topology information table created by an in-vehicle ECU in the in-vehicle system according to the embodiment of the present disclosure.

FIG. 5 to FIG. 7 each show an example of a topology information table created by an in-vehicle ECU in the in-vehicle system according to the embodiment of the present disclosure. FIG. 5 shows a topology information table tp1 created by the in-vehicle ECU 111A, FIG. 6 shows a topology information table tp2 created by the in-vehicle ECU 111B, and FIG. 7 shows a topology information table tp3 created by the in-vehicle ECU 111C.

With reference to FIG. 5, the in-vehicle ECU 111A performs communication with the relay device 201A, thereby creating the topology information table tp1 showing a correspondence relationship between the device ID, the connection port ID, the adjacent node ID, and the adjacent connection port ID of the in-vehicle ECU 111A.

With reference to FIG. 6, the in-vehicle ECU 111B performs communication with the relay device 201B, thereby creating the topology information table tp2 showing a correspondence relationship between the device ID, the connection port ID, the adjacent node ID, and the adjacent connection port ID of the in-vehicle ECU 111B.

With reference to FIG. 7, the in-vehicle ECU 111C performs communication with the relay device 201B, thereby creating the topology information table tp3 showing a correspondence relationship between the device ID, the connection port ID, the adjacent node ID, and the adjacent connection port ID of the in-vehicle ECU 111C.

FIG. 8 and FIG. 9 each show an example of a topology information table created by a relay device in the in-vehicle system according to the embodiment of the present disclosure. FIG. 8 shows a topology information table tp11 created by the relay device 201A. FIG. 9 shows a topology information table tp12 created by the relay device 201B.

With reference to FIG. 8, the relay unit 23 in the relay device 201A performs communication with the in-vehicle ECU 111A and the relay device 201B, thereby creating the topology information table tp11 showing a correspondence relationship between the device ID, the connection port ID, the adjacent node ID, and the adjacent connection port ID of the relay device 201A.

With reference to FIG. 9, the relay device 201B performs communication with the in-vehicle ECUs 111B, 111C and the relay device 201A, thereby creating the topology information table tp12 showing a correspondence relationship between the device ID, the connection port ID, the adjacent node ID, and the adjacent connection port ID of the relay device 201B.

(Creation of Application Information Table)

An in-vehicle device creates the application information table ap showing a correspondence relationship between the device ID of the in-vehicle device, the application ID being an identifier for an application 112 included in the in-vehicle device, and the version of the application 112.

In the following, the application IDs of the application 112A, the application 112B, and the application 112C are assumed to be "A001", "A002", and "A003", respectively. The versions of the application 112A, the application 112B, and the application 112C are assumed to be all "1.0.0". The relay device 201 is assumed not to include any application 112.

Figure 10:
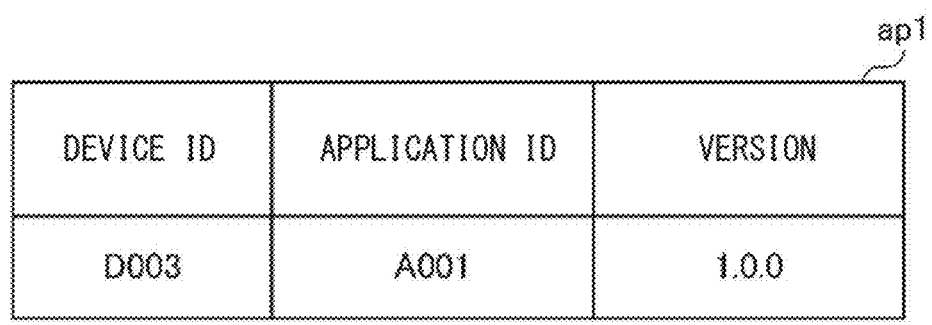
FIG. 10 shows an example of an application information table created by an in-vehicle ECU in the in-vehicle system according to the embodiment of the present disclosure.
Figure 11:
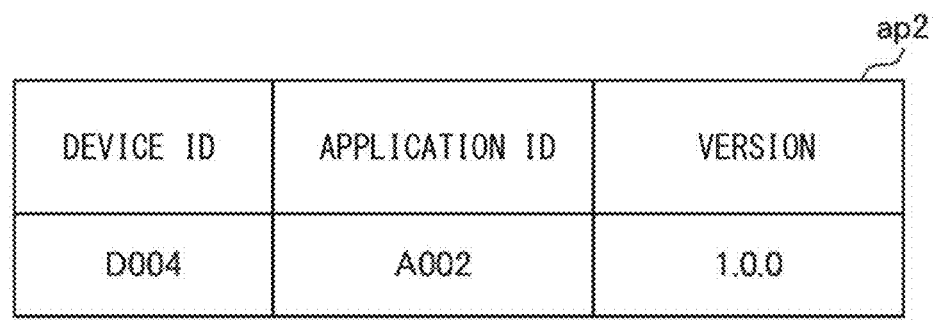
FIG. 11 shows an example of an application information table created by an in-vehicle ECU in the in-vehicle system according to the embodiment of the present disclosure.
Figure 12:
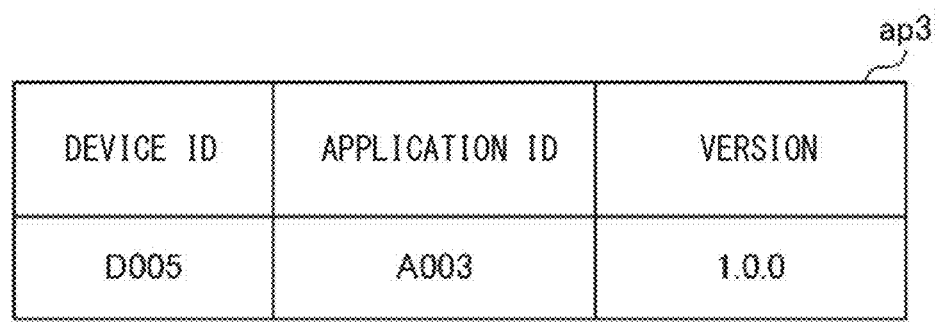
FIG. 12 shows an example of an application information table created by an in-vehicle ECU in the in-vehicle system according to the embodiment of the present disclosure.

FIG. 10 to FIG. 12 each show an example of an application information table created by an in-vehicle ECU in the in-vehicle system according to the embodiment of the present disclosure. FIG. 10 shows an application information table ap1 created by the in-vehicle ECU 111A, FIG. 11 shows an application information table ap2 created by the in-vehicle ECU 111B, and FIG. 12 shows an application information table ap3 created by the in-vehicle ECU 111C.

With reference to FIG. 10, the in-vehicle ECU 111A creates the application information table ap1 showing a correspondence relationship between the device ID, the application ID of the application 112A, and the version of the application 112A of the in-vehicle ECU 111A.

With reference to FIG. 11, the in-vehicle ECU 111B creates the application information table ap2 showing a correspondence relationship between the device ID, the application ID of the application 112B, and the version of the application 112B of the in-vehicle ECU 111B.

With reference to FIG. 12, the in-vehicle ECU 111C creates the application information table ap3 showing a correspondence relationship between the device ID, the application ID of the application 112C, and the version of the application 112C of the in-vehicle ECU 111C.

(Creation of Topology Integration Table and Application Integration Table)

The in-vehicle ECU 111A causes the created topology information table tp1 and application information table ap1 to be included in a frame F1 and transmits the frame F1 to the relay device 201A. The in-vehicle ECU 111B causes the created topology information table tp2 and application information table ap2 to be included in a frame F2 and transmits the frame F2 to the relay device 201B. The in-vehicle ECU 111C causes the created topology information table tp3 and application information table ap3 to be included in a frame F3 and transmits the frame F3 to the relay device 201B.

The relay device 201B causes the created topology information table tp12 to be included in a frame F12 and transmits the frame F12 to the relay device 201A. In addition, the relay device 201B receives the frame F2 including the topology information table tp2 and the application information table ap2 from the in-vehicle ECU 111B via the communication port 21B, and transmits the received frame F2 to the relay device 201A via the communication port 21A. In addition, the relay device 201B receives the frame F3 including the topology information table tp3 and the application information table ap3 from the in-vehicle ECU 111C via the communication port 21D, and transmits the received frame F3 to the relay device 201A via the communication port 21A.

The relay unit 23 in the relay device 201A outputs the created topology information table tp11 to the state information acquisition unit 12. In addition, the relay unit 23 receives the frame F1 from the in-vehicle ECU 111A via the communication port 21A, and outputs the received frame F1 to the state information acquisition unit 12. In addition, the relay unit 23 receives the frames F2, F3, F12 from the relay device 201B via the communication port 21C, and outputs the received frames F2, F3, F12 to the state information acquisition unit 12.

The state information acquisition unit 12 receives the frames F1, F2, F3, F12 from the relay unit 23, acquires the topology information table tp1 and the application information table ap1 from the frame F1, acquires the topology information table tp2 and the application information table ap2 from the frame F2, acquires the topology information table tp3 and the application information table ap3 from the frame F3, and acquires the topology information table tp12 from the frame F12.

Figure 13:
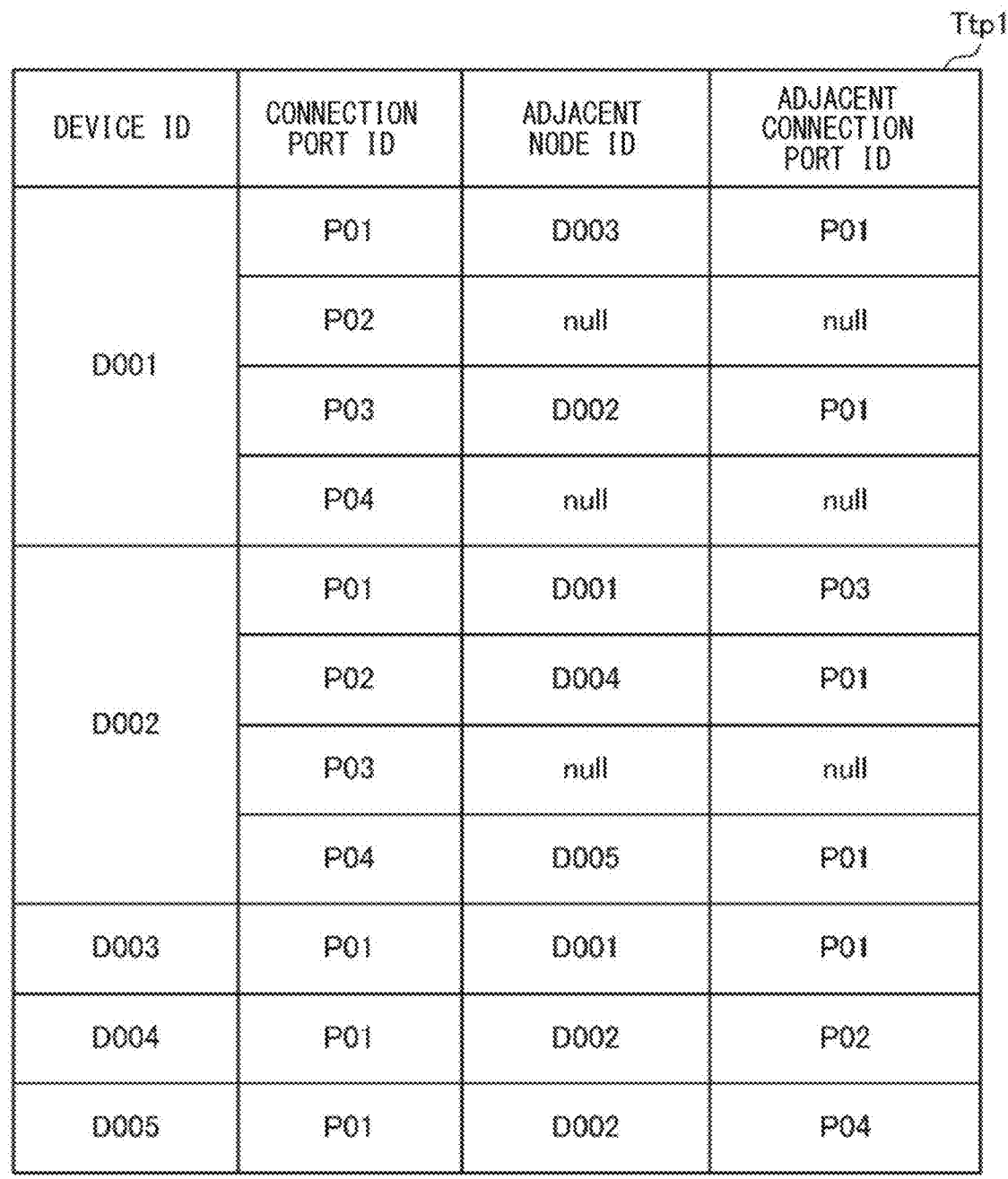
FIG. 13 shows an example of a topology integration table created by a state information acquisition unit in a management unit according to the embodiment of the present disclosure.

FIG. 13 shows an example of a topology integration table created by a state information acquisition unit in a management unit according to the embodiment of the present disclosure. FIG. 13 shows a topology integration table Ttp1 being the topology integration table Ttp showing the assembly state of the relay device 201 and the in-vehicle ECU 111 shown in FIG. 2. With reference to FIG. 13, the state information acquisition unit 12 integrates the topology information table tp11 received from the relay unit 23 and the acquired topology information tables tp1, tp2, tp3, tp12, thereby creating the topology integration table Ttp1. The topology integration table Ttp1 is an example of the state information.

Figure 14:
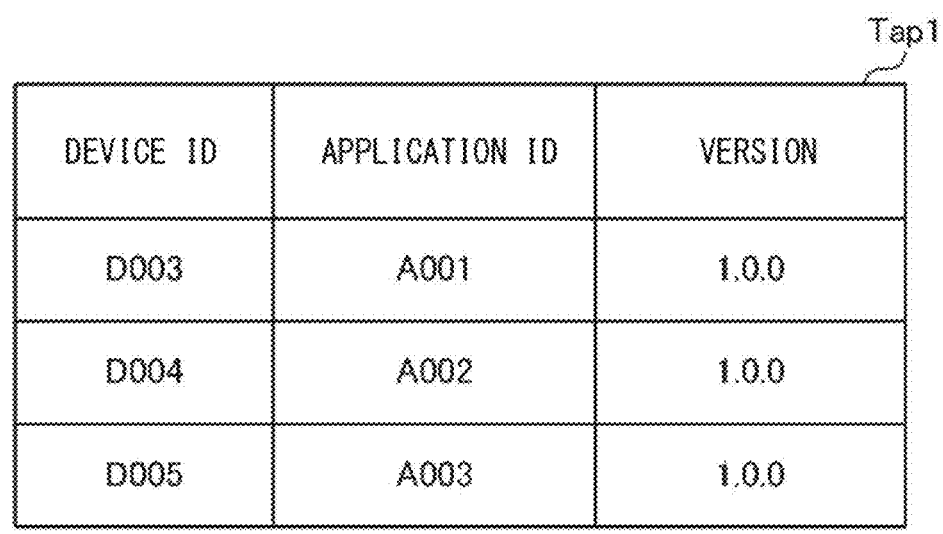
FIG. 14 shows an example of an application integration table created by the state information acquisition unit in the management unit according to the embodiment of the present disclosure.

FIG. 14 shows an example of an application integration table created by the state information acquisition unit in the management unit according to the embodiment of the present disclosure. FIG. 14 shows an application integration table Tap being the application integration table Tap showing the assembly state of the relay device 201 and the in-vehicle ECU 111 shown in FIG. 2. With reference to FIG. 14, the state information acquisition unit 12 integrates the acquired application information tables ap1, ap2, ap3, thereby creating the application integration table Tap1. The application integration table Tap1 is an example of the state information.

The state information acquisition unit 12 outputs the created topology integration table Ttp1 and application integration table Tap1 to the comparison unit 13.

<Specification Information Acquisition Unit>

The specification information acquisition unit 11 acquires specification information indicating the specification of the configuration of the in-vehicle network. More specifically, the specification information acquisition unit 11 acquires specification information indicating the specification of assembly, in the in-vehicle network, of a plurality of in-vehicle devices forming the in-vehicle network.

(Acquisition of Topology Specification Table and Application Specification Table)

For example, the specification information acquisition unit 11 acquires, as the specification information, a topology specification table Stp showing the specification of the topology of each in-vehicle device in the in-vehicle network, and an application specification table Sap showing the specification of a plurality of combinations of an in-vehicle device and software mounted to the in-vehicle device.

The topology specification table Stp shows a correspondence relationship, for each in-vehicle device, between the device ID, the connection port ID, the adjacent node ID, and the adjacent connection port ID. The application specification table Sap shows a correspondence relationship, for each in-vehicle device, between the device ID, the application ID being an identifier for an application 112 included in the in-vehicle device, and the version of the application 112.

With reference to FIG. 1 again, the storage 402 in the server 401 has stored therein a database showing a correspondence relationship between: the management number of the in-vehicle network in the vehicle 1; and the topology specification table Stp and the application specification table Sap.

With reference to FIG. 4 again, the specification information acquisition unit 11 acquires the topology specification table Stp and the application specification table Sap that correspond to the management number of the in-vehicle network, from the server 401 outside the vehicle 1. For example, the specification information acquisition unit 11 acquires, from the server 401, the topology specification table Stp and the application specification table Sap that correspond to the management number provided in advance before the management unit 101 is assembled into the vehicle 1.

More specifically, when assembly of all the in-vehicle ECUs 111 and all the relay devices 201 in the in-vehicle system 301 has been completed, the manufacturer of the vehicle 1 connects the server 401 to the inspection port 22 in the relay device 201A through a cable and a WAN (Wide Area Network) (which are not shown).

When the server 401 has been connected to the inspection port 22 through the cable, the specification information acquisition unit 11 acquires the management number of "CN01" from the storage 24, and transmits a specification information request including the acquired management number to the server 401 via the inspection port 22.

Figure 16:
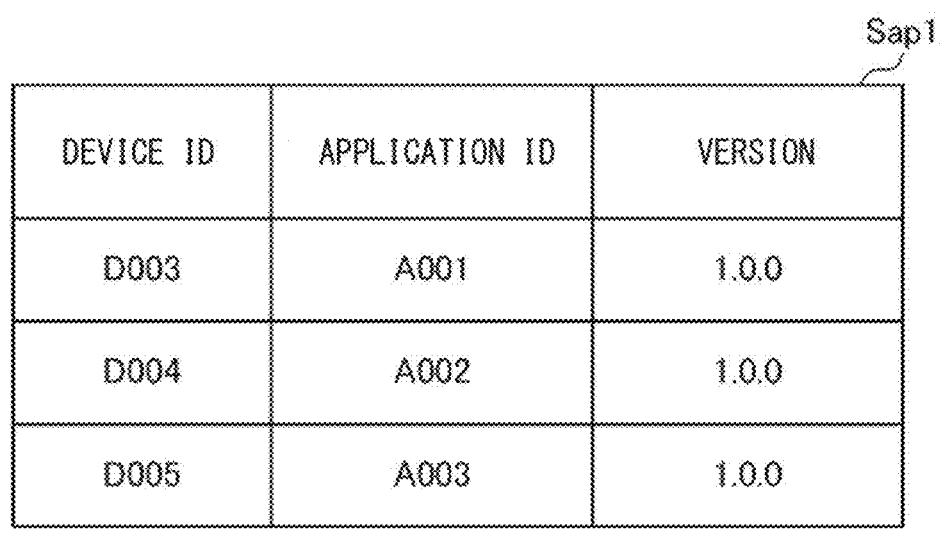
FIG. 16 shows an example of an application specification table transmitted from the server to a relay device according to the embodiment of the present disclosure.

FIG. 15 shows an example of a topology specification table transmitted from a server to a relay device according to the embodiment of the present disclosure. FIG. 16 shows an example of an application specification table transmitted from the server to a relay device according to the embodiment of the present disclosure.

With reference to FIG. 15 and FIG. 16, when the server 401 has received the specification information request from the relay device 201A, the server 401 acquires, from the database in the storage 402, a topology specification table Stp1 and an application specification table Sap1 that correspond to "CN01" being the management number indicated by the received specification information request, and transmits the acquired topology specification table Stp1 and application specification table Sap1 to the relay device 201A.

The specification information acquisition unit 11 receives the topology specification table Stp1 and the application specification table Sap1 from the server 401 via the inspection port 22, and outputs the received topology specification table Stp1 and application specification table Sap1 to the comparison unit 13.

The specification information acquisition unit 11 may be configured to receive the topology specification table Stp and the application specification table Sap from the server 401 through wireless communication.

<Comparison Unit>

The comparison unit 13 performs a comparison process of comparing the specification shown in the topology specification table Stp1 and the application specification table Sap1 acquired by the specification information acquisition unit 11, with the assembly state shown in the topology integration table Ttp1 and the application integration table Tap1 acquired by the state information acquisition unit 12. For example, the comparison unit 13 performs the above comparison process as inspection of the vehicle 1.

(Comparison Process)

Figure 17:
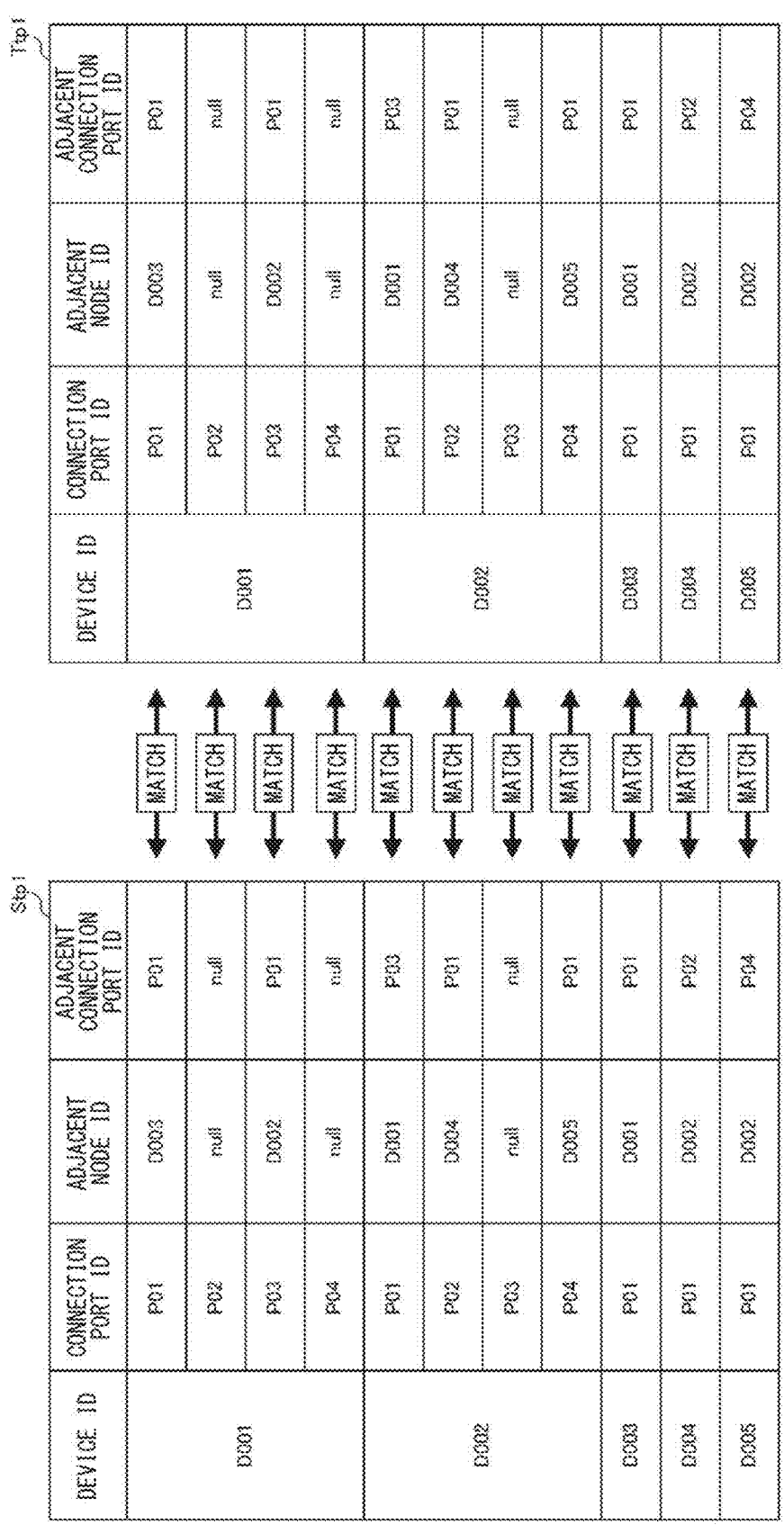
FIG. 17 shows an example of a comparison process by a comparison unit in the management unit according to the embodiment of the present disclosure.
Figure 18:
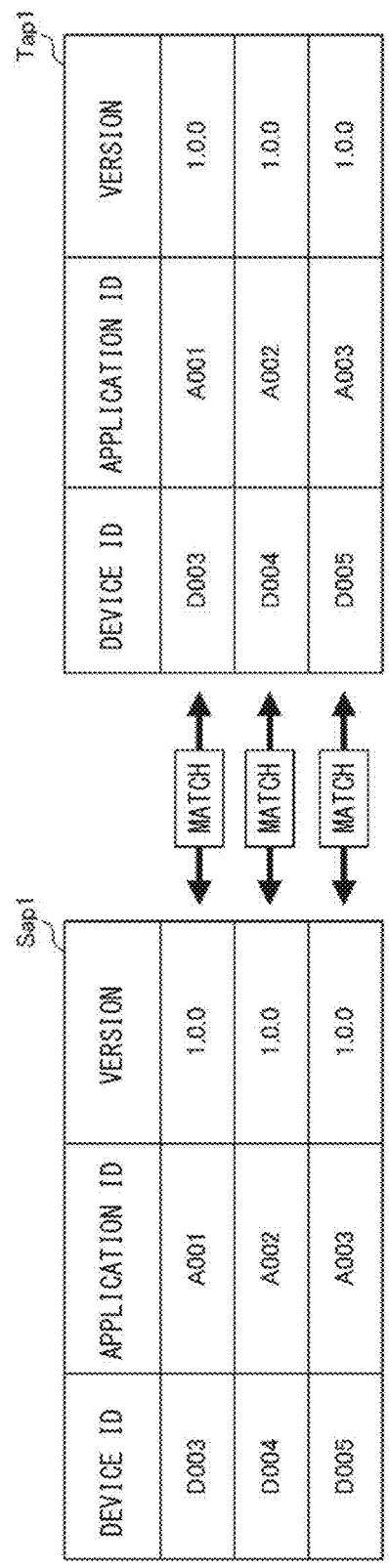
FIG. 18 shows an example of a comparison process by the comparison unit in the management unit according to the embodiment of the present disclosure.

FIG. 17 and FIG. 18 each show an example of a comparison process by a comparison unit in the management unit according to the embodiment of the present disclosure.

With reference to FIG. 17, the comparison unit 13 compares the topology specification table Stp1 received from the specification information acquisition unit 11 with the topology integration table Ttp1 received from the state information acquisition unit 12. Specifically, the comparison unit 13 checks the topology specification table Stp1 against the topology integration table Ttp1 for each row, and determines whether or not there is a match for each row.

With reference to FIG. 18, the comparison unit 13 compares the application specification table Sap1 received from the specification information acquisition unit 11 with the application integration table Tap1 received from the state information acquisition unit 12. Specifically, the comparison unit 13 checks the application specification table Sap1 against the application integration table Tap1 for each row, and determines whether or not there is a match for each row.

In the example shown in FIG. 17, the topology specification table Stp1 and the topology integration table Ttp1 match each other in all the rows. In the example shown in FIG. 18, the application specification table Sap1 and the application integration table Tap1 match each other in all the rows.

This indicates that the assembly state of the relay device 201 and the in-vehicle ECU 111 shown in FIG. 2 conforms to the specification of the assembly state of the relay device 201 and the in-vehicle ECU 111. i.e., the specification of the configuration of the in-vehicle network.

For example, as a result of the comparison process, the comparison unit 13 outputs, to the notification unit 14, a topology determination result indicating that the topology specification table Stp1 and the topology integration table Ttp1 match each other in all the rows, and an application determination result indicating that the application specification table Sap1 and the application integration table Tap1 match each other in all the rows.

The notification unit 14 performs a notification process of notifying a user of a comparison result by the comparison unit 13. More specifically, the notification unit 14 receives the topology determination result and the application determination result from the comparison unit 13, and notifies the user, i.e., the manufacturer of the vehicle 1, of the received topology determination result and application determination result as an inspection result of the vehicle 1.

[Another Example of In-Vehicle System—1]

Figure 19:
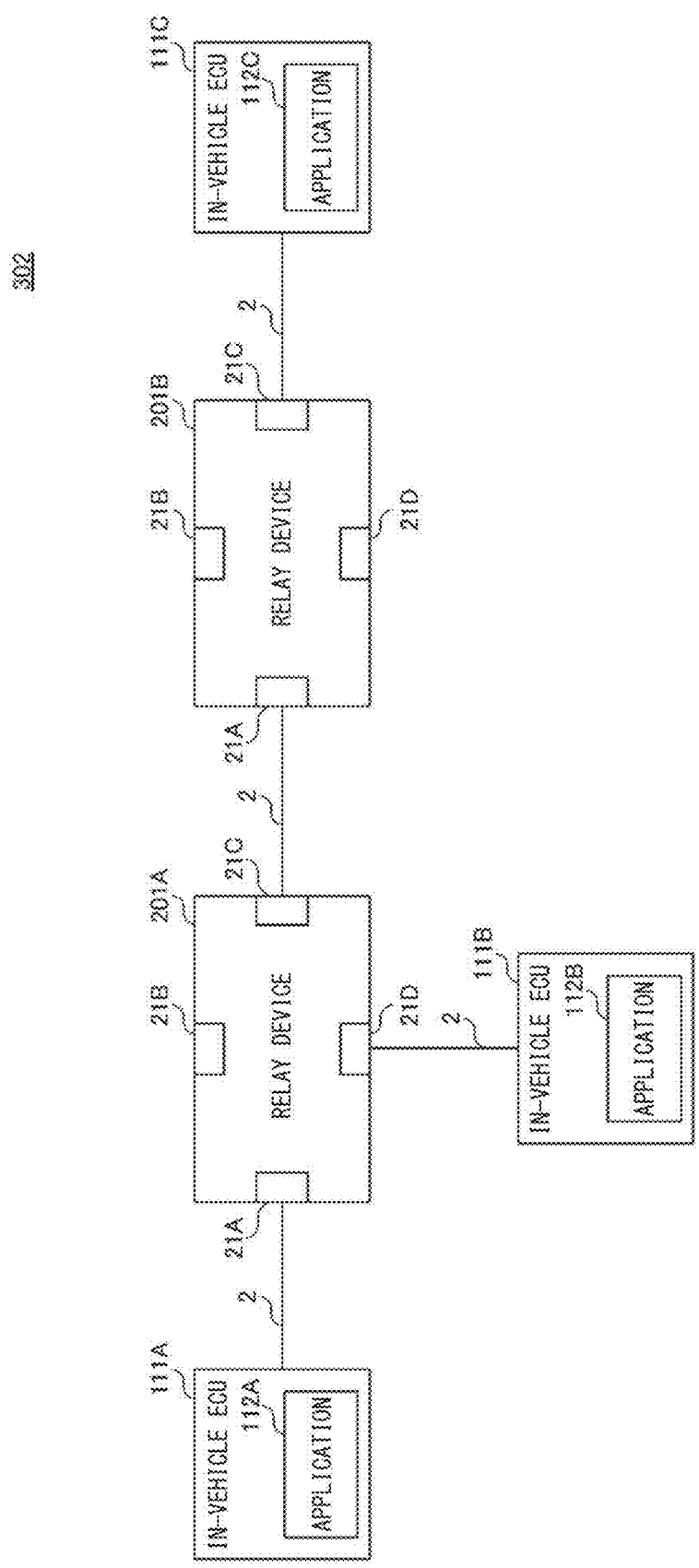
FIG. 19 shows another example of the configuration of the in-vehicle system according to the embodiment of the present disclosure.

FIG. 19 shows another example of the configuration of the in-vehicle system according to the embodiment of the present disclosure. FIG. 19 shows an in-vehicle system 302 manufactured by the relay device 201 and the in-vehicle ECU 111 being assembled into the vehicle 1 by the manufacturer of the vehicle 1.

With reference to FIG. 19, in the in-vehicle system 302, when compared with the in-vehicle system 301 shown in FIG. 2, the in-vehicle ECU 111B is connected to the communication port 21D in the relay device 201A instead of being connected to the communication port 21B in the relay device 201B, and the in-vehicle ECU 111C is connected to the communication port 21C in the relay device 201B instead of being connected to the communication port 21D in the relay device 201B.

(Creation of Topology Integration Table and Application Integration Table)

As described above, the state information acquisition unit 12 in the management unit 101 of the relay device 201A acquires the topology information table tp and the application information table ap from each in-vehicle device.

Figure 20:
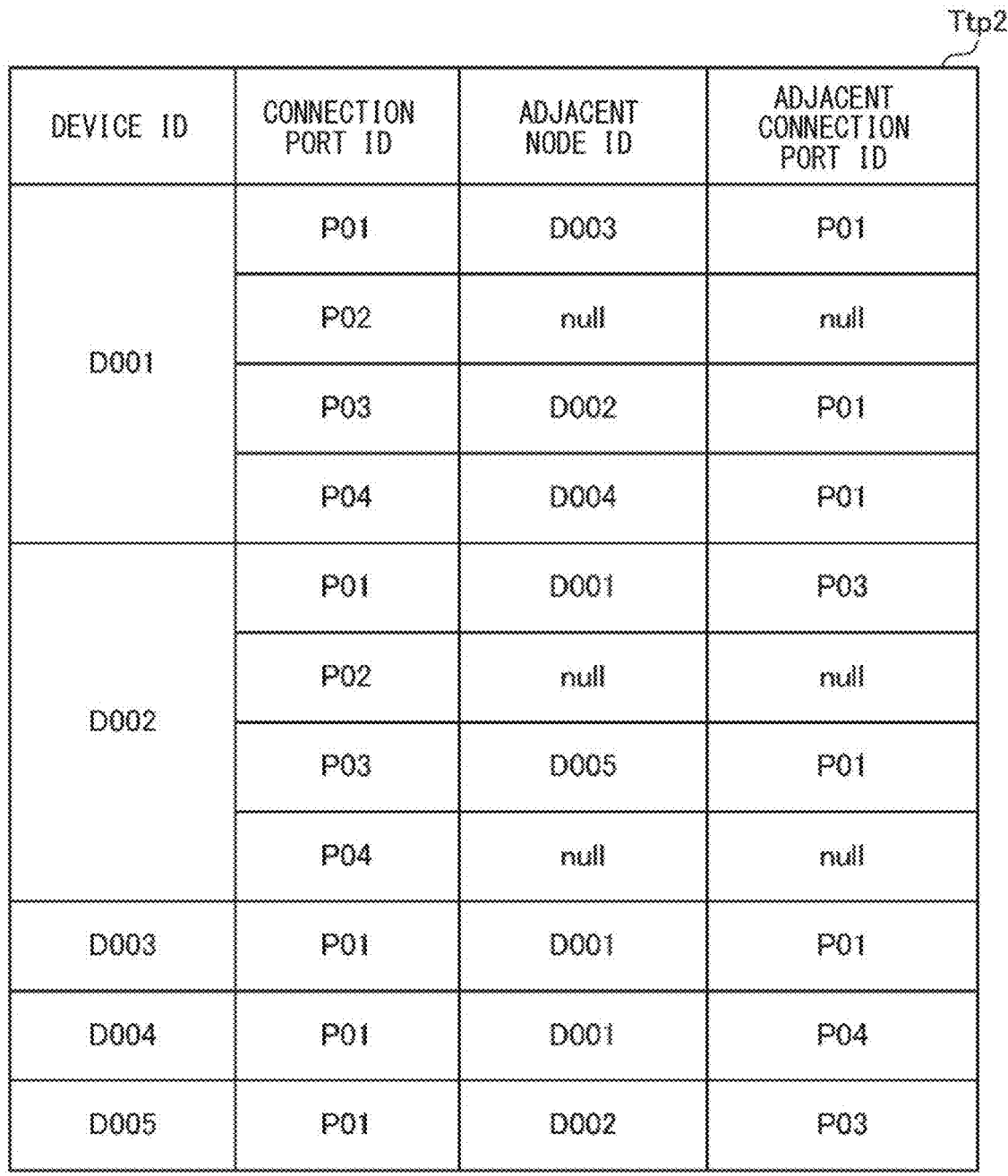
FIG. 20 shows another example of the topology integration table created by the state information acquisition unit in the management unit according to the embodiment of the present disclosure.

FIG. 20 shows another example of the topology integration table created by the state information acquisition unit in the management unit according to the embodiment of the present disclosure. FIG. 20 shows a topology integration table Ttp2 being the topology integration table Ttp showing the assembly state of the relay device 201 and the in-vehicle ECU 111 shown in FIG. 19. With reference to FIG. 20, the state information acquisition unit 12 acquires the topology information table tp from each in-vehicle device and integrates the acquired topology information tables tp, thereby creating the topology integration table Ttp2. The topology integration table Ttp2 is an example of the state information.

Figure 21:
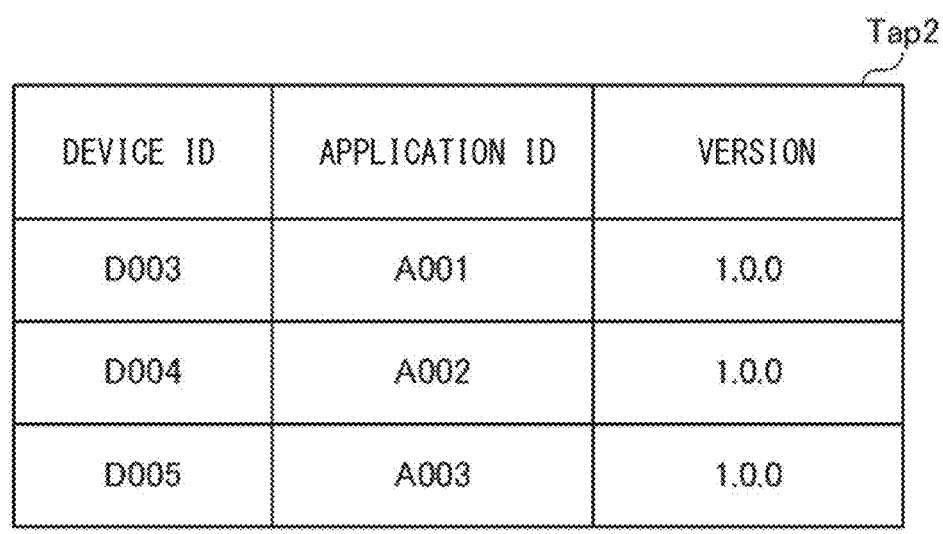
FIG. 21 shows another example of the application integration table created by the state information acquisition unit in the management unit according to the embodiment of the present disclosure.

FIG. 21 shows another example of the application integration table created by the state information acquisition unit in the management unit according to the embodiment of the present disclosure. FIG. 21 shows an application integration table Tap2 being the application integration table Tap showing the assembly state of the relay device 201 and the in-vehicle ECU 111 shown in FIG. 19. With reference to FIG. 21, the state information acquisition unit 12 acquires the application information table ap from each in-vehicle device and integrates the acquired application information tables ap, thereby creating the application integration table Tap2. The application integration table Tap2 is an example of the state information.

The state information acquisition unit 12 outputs the created topology integration table Ttp2 and application integration table Tap2 to the comparison unit 13.

(Acquisition of Topology Specification Table and Application Specification Table)

As described above, when the server 401 has been connected to the inspection port 22 through the cable by the manufacturer of the vehicle 1, the specification information acquisition unit 11 in the management unit 101 of the relay device 201A acquires the management number of "CN01" from the storage 24, and transmits a specification information request including the acquired management number to the server 401 via the inspection port 22.

Then, the specification information acquisition unit 11 receives the topology specification table Stp1 shown in FIG. 15 and the application specification table Sap1 shown in FIG. 16 from the server 401 via the inspection port 22, and outputs the received topology specification table Stp1 and application specification table Sap1 to the comparison unit 13.

(Comparison Process)

Figure 22:
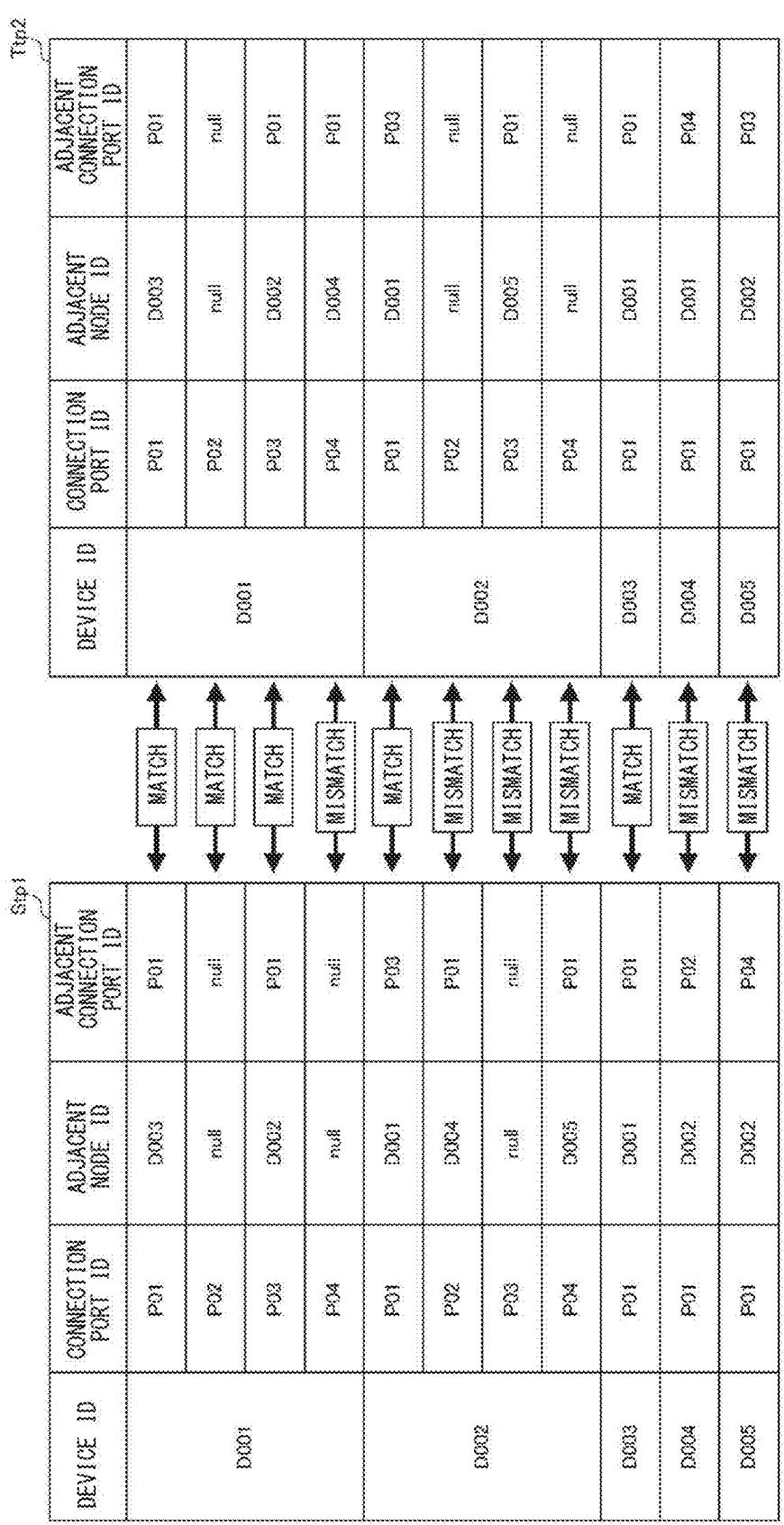
FIG. 22 shows another example of the comparison process by the comparison unit in the management unit according to the embodiment of the present disclosure.
Figure 23:
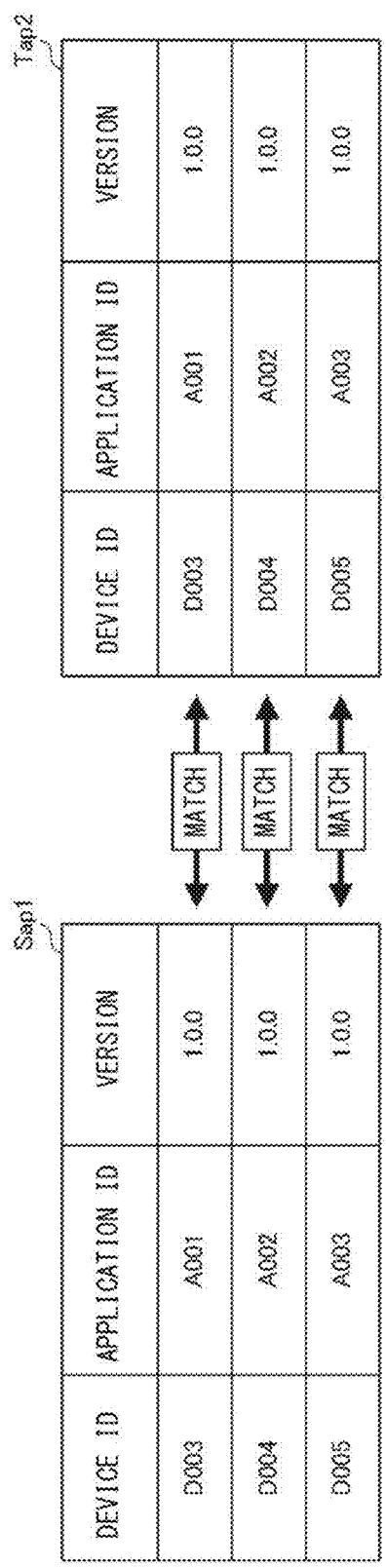
FIG. 23 shows another example of the comparison process by the comparison unit in the management unit according to the embodiment of the present disclosure.

FIG. 22 and FIG. 23 each show another example of the comparison process by the comparison unit in the management unit according to the embodiment of the present disclosure.

With reference to FIG. 22, the comparison unit 13 compares the topology specification table Stp1 received from the specification information acquisition unit 11 with the topology integration table Ttp2 received from the state information acquisition unit 12. Specifically, the comparison unit 13 checks the topology specification table Stp1 against the topology integration table Ttp2 for each row, and determines whether or not there is a match for each row.

With reference to FIG. 23, the comparison unit 13 compares the application specification table Sap1 received from the specification information acquisition unit 11 with the application integration table Tap2 received from the state information acquisition unit 12. Specifically, the comparison unit 13 checks the application specification table Sap1 against the application integration table Tap2 for each row, and determines whether or not there is a match for each row.

In the example shown in FIG. 23, the application specification table Sap1 and the application integration table Tap2 match each other in all the rows. Meanwhile, in the example shown in FIG. 22, the topology specification table Stp1 and the topology integration table Ttp2 do not match each other in some rows.

This indicates that the assembly state of the relay device 201 and the in-vehicle ECU 111 shown in FIG. 19 does not conform to the specification of the assembly state of the relay device 201 and the in-vehicle ECU 111, i.e., the specification of the configuration of the in-vehicle network. More specifically, it is indicated that an application 112 conforming to the specification is included in each in-vehicle ECU 111, whereas the topology of the relay device 201 and the in-vehicle ECU 111 does not conform to the specification of the configuration of the in-vehicle network. Thus, in the management unit 101, when an application 112 conforming to the specification is included in each in-vehicle device, whereas the topology of the in-vehicle devices does not conform to the specification of the configuration of the in-vehicle network, the fact that the topology of the in-vehicle devices does not conform to the specification of the configuration of the in-vehicle network can be detected.

For example, as a result of the comparison process, the comparison unit 13 outputs, to the notification unit 14, a topology determination result indicating the rows that do not match each other in the topology specification table Stp1 and the topology integration table Ttp2, and an application determination result indicating that the application specification table Sap1 and the application integration table Tap2 match each other in all the rows.

The notification unit 14 receives the topology determination result and the application determination result from the comparison unit 13, and notifies the user, i.e., the manufacturer of the vehicle 1, of the received topology determination result and application determination result as an inspection result of the vehicle 1. For example, when the assembly state of the relay device 201 and the in-vehicle ECU 111 does not match the specification of the configuration of the in-vehicle network, the notification unit 14 performs a notification process that allows recognition of the in-vehicle device, among the relay device 201 and the in-vehicle ECU 111, in which the assembly state does not match the specification.

More specifically, the notification unit 14 notifies the manufacturer of the vehicle 1 that the connection state between the in-vehicle device indicated by "device ID" and the in-vehicle device indicated by "adjacent node ID" in the row having a mismatch indicated by the topology determination result is inappropriate. Specifically, as an inspection result of the vehicle 1, the notification unit 14 notifies the manufacturer of the vehicle 1 that the connection state between the relay device 201A and the in-vehicle ECU 111B, and the connection state between the relay device 201B and the in-vehicle ECU 111C are inappropriate.

(Change of Settings of Relay Device)

For example, when having determined that the assembly state of the relay device 201 and the in-vehicle ECU 111 in the in-vehicle system 302 does not conform to the specification of the configuration of the in-vehicle network, the comparison unit 13 acquires setting information for changing the settings of the relay process in the relay device 201 to settings that allow the relay process of information between the in-vehicle ECUs Ill to be appropriately performed in the in-vehicle system 302.

More specifically, when having determined that the assembly state of the relay device 201 and the in-vehicle ECU 111 in the in-vehicle system 302 does not conform to the specification of the configuration of the in-vehicle network, the comparison unit 13 transmits a setting information request including the topology integration table Ttp2 and the application integration table Tap2, to the server 401 via the specification information acquisition unit 11 and the inspection port 22.

The storage 402 in the server 401 has stored therein a setting information database showing a correspondence relationship between: the topology integration table Ttp and the application integration table Tap; and the setting information of the relay device 201. Upon receiving the setting information request from the relay device 201A, the server 401 acquires setting information corresponding to the topology integration table Ttp2 and the application integration table Tap2 indicated by the received setting information request, from the setting information database in the storage 402, and transmits the acquired setting information to the relay device 201A.

The comparison unit 13 receives the setting information from the server 401 via the inspection port 22 and the specification information acquisition unit 11, and outputs the received setting information to the relay unit 23.

The relay unit 23 changes the settings of the relay process, based on the received setting information. In addition, the relay unit 23 transmits the setting information to the relay device 201B via the communication port 21C.

The relay device 201B changes the settings of the relay process, based on the setting information received from the relay device 201A.

[Another Example of In-Vehicle System—2]

Figure 24:
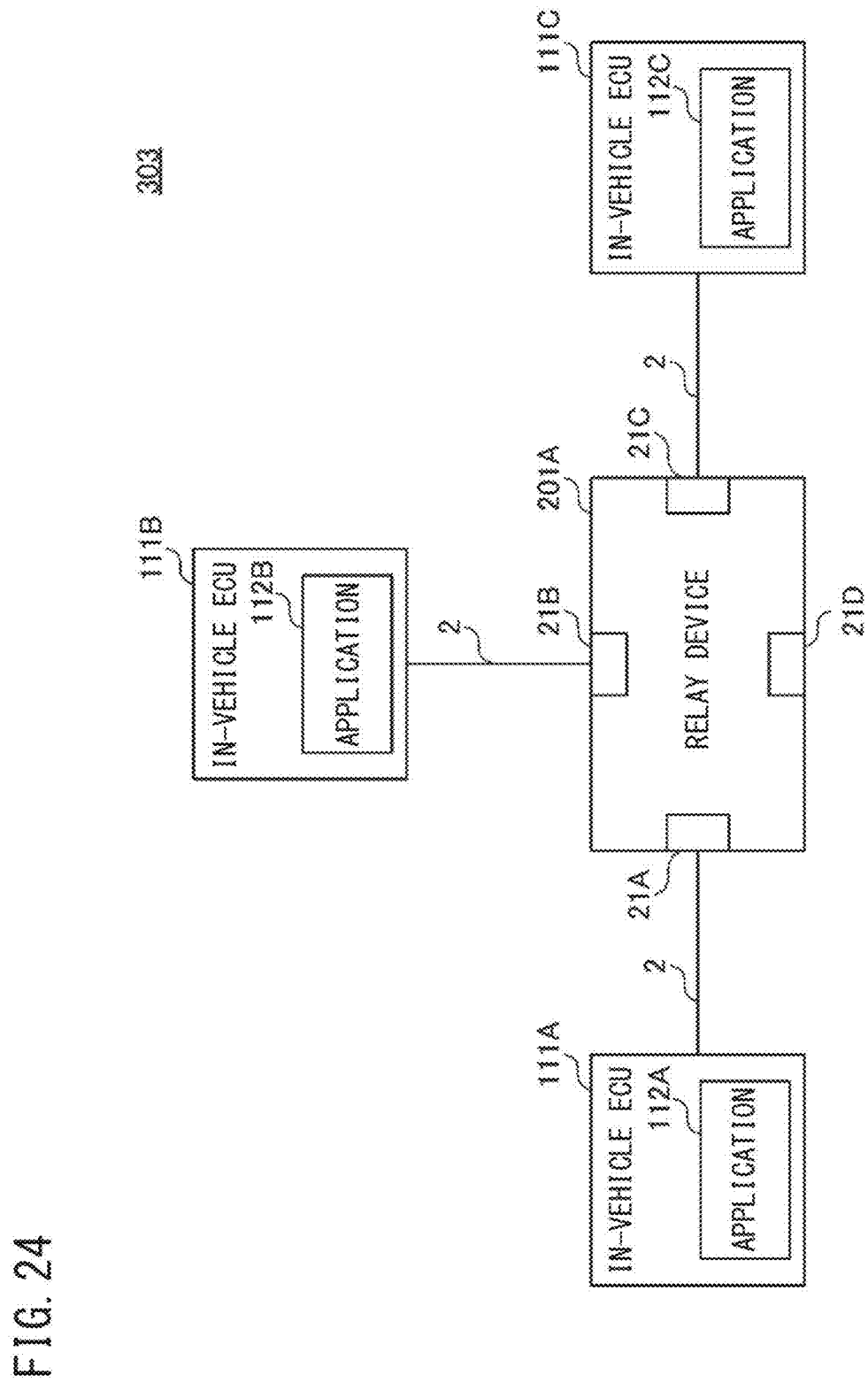
FIG. 24 shows another example of the configuration of the in-vehicle system according to the embodiment of the present disclosure.

FIG. 24 shows another example of the configuration of the in-vehicle system according to the embodiment of the present disclosure. FIG. 24 shows an in-vehicle system 303 manufactured by the relay device 201 and the in-vehicle ECU 111 being assembled into the vehicle 1 by the manufacturer of the vehicle 1.

FIG. 25 shows a configuration of each in-vehicle device in the in-vehicle system according to the embodiment of the present disclosure. As a configuration of each in-vehicle device in the in-vehicle system 303, FIG. 25 shows a device ID, a device name, a device type, the number of communication ports, and the number of applications of the in-vehicle device.

With reference to FIG. 24 and FIG. 25, the in-vehicle system 303 includes the relay device 201A as the relay device 201. The in-vehicle system 303 includes the in-vehicle ECUs 111A, 111B, 111C as the in-vehicle ECU 111.

The in-vehicle ECU 111A is connected to the communication port 21A in the relay device 201A through the cable 2. The in-vehicle ECU 111B is connected to the communication port 21B in the relay device 201A through the cable 2. The in-vehicle ECU 111C is connected to the communication port 21C in the relay device 201A through the cable 2.

The in-vehicle ECU 111A includes the application 112A, the in-vehicle ECU 111B includes the application 112B, and the in-vehicle ECU 111C includes the application 112C.

For example, the manufacturer of the relay device 201A writes "CN02" as the management number into the storage 24 in the relay device 201A.

(Creation of Topology Integration Table and Application Integration Table)

As described above, the state information acquisition unit 12 in the management unit 101 of the relay device 201A acquires the topology information table tp and the application information table ap from each in-vehicle device.

Figure 26:
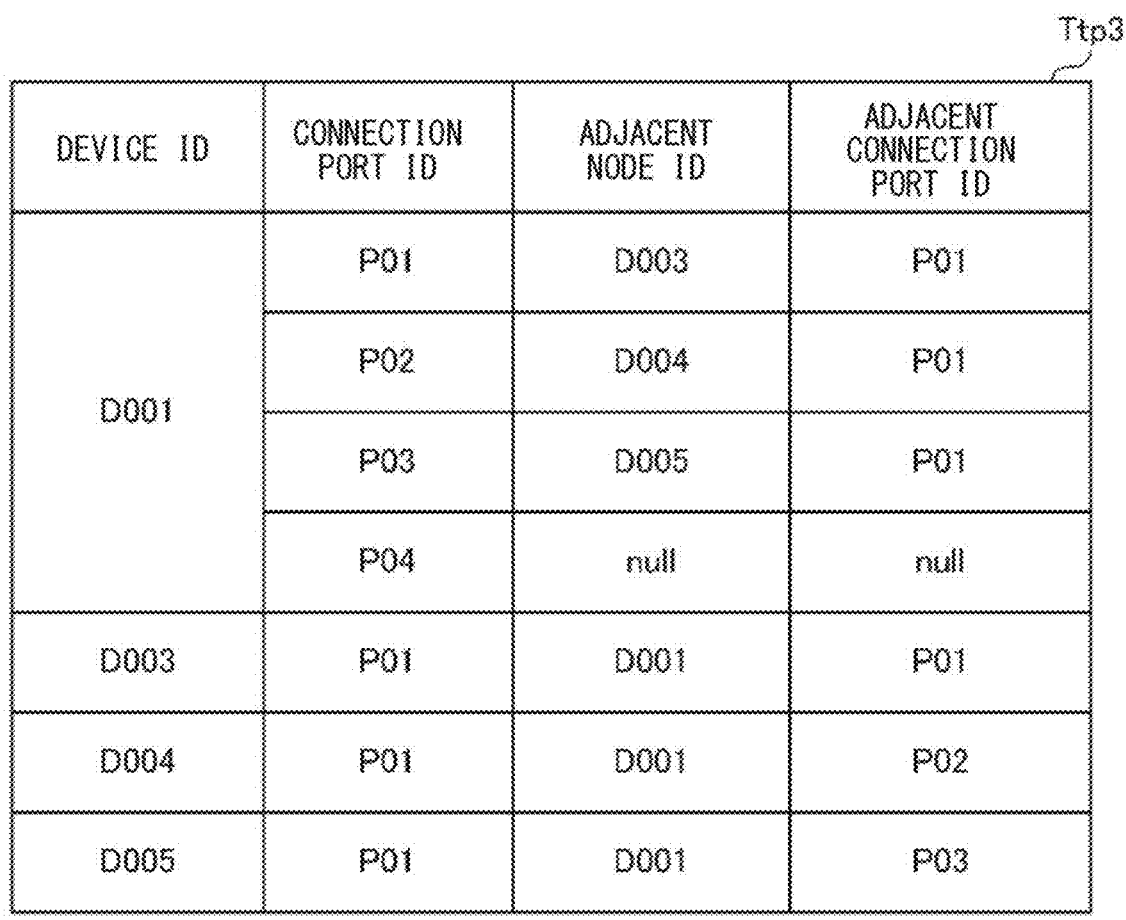
FIG. 26 shows another example of the topology integration table created by the state information acquisition unit in the management unit according to the embodiment of the present disclosure.

FIG. 26 shows another example of the topology integration table created by the state information acquisition unit in the management unit according to the embodiment of the present disclosure. FIG. 26 shows a topology integration table Ttp3 being the topology integration table Ttp showing the assembly state of the relay device 201 and the in-vehicle ECU Ill shown in FIG. 24. With reference to FIG. 26, the state information acquisition unit 12 acquires the topology information table tp from each in-vehicle device, and integrates the acquired topology information tables tp, thereby creating the topology integration table Ttp3. The topology integration table Ttp3 is an example of the state information.

Figure 27:
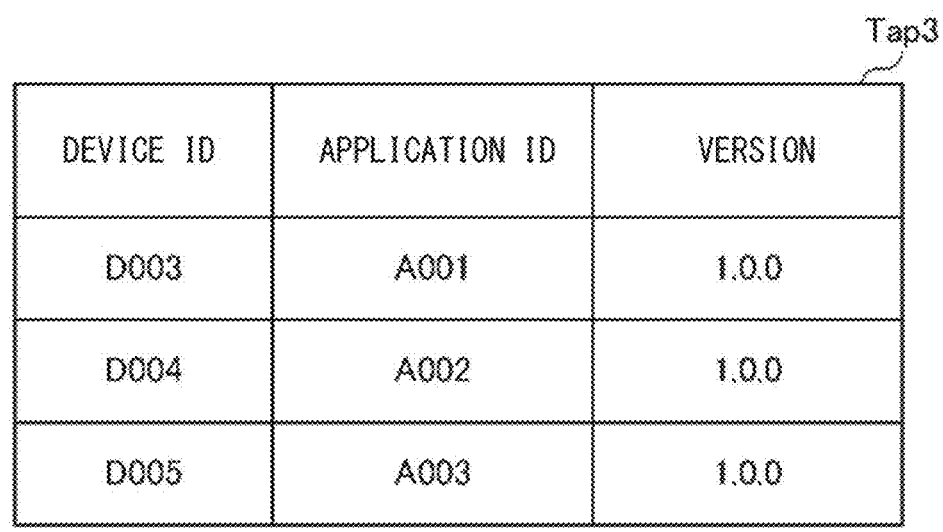
FIG. 27 shows another example of the application integration table created by the state information acquisition unit in the management unit according to the embodiment of the present disclosure.

FIG. 27 shows another example of the application integration table created by the state information acquisition unit in the management unit according to the embodiment of the present disclosure. FIG. 27 shows an application integration table Tap3 being the application integration table Tap showing the assembly state of the relay device 201 and the in-vehicle ECU 111 shown in FIG. 24. With reference to FIG. 27, the state information acquisition unit 12 acquires the application information table ap from each in-vehicle device and integrates the acquired application information tables ap, thereby creating the application integration table Tap3. The application integration table Tap3 is an example of the state information.

The state information acquisition unit 12 outputs the created topology integration table Ttp3 and application integration table Tap3 to the comparison unit 13.

(Acquisition of Topology Specification Table and Application Specification Table)

When the server 401 has been connected to the inspection port 22 through the cable, the specification information acquisition unit 11 in the management unit 101 of the relay device 201A acquires the management number of "CN02" from the storage 24, and transmits a specification information request including the acquired management number to the server 401 via the inspection port 22.

Figure 29:
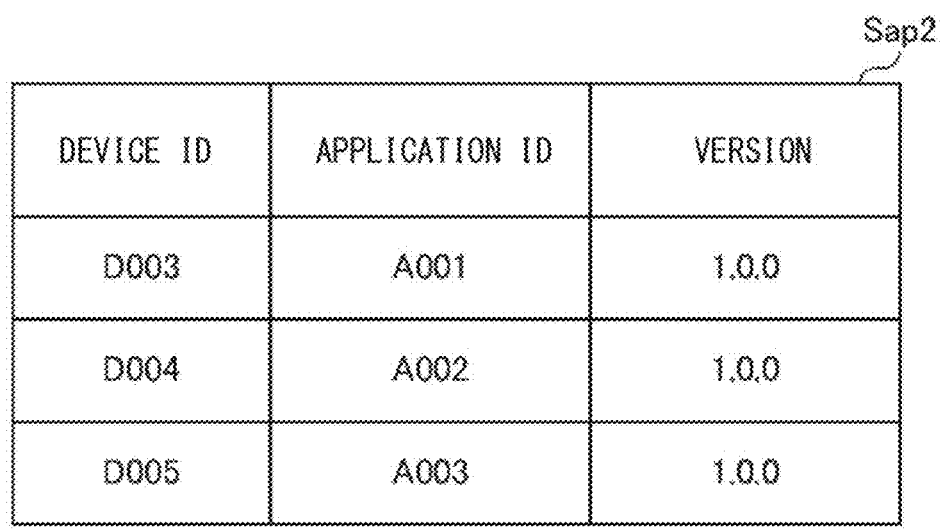
FIG. 29 shows another example of the application specification table transmitted from the server to a relay device according to the embodiment of the present disclosure.

FIG. 28 shows another example of the topology specification table transmitted from the server to a relay device according to the embodiment of the present disclosure. FIG. 29 shows another example of the application specification table transmitted from the server to a relay device according to the embodiment of the present disclosure.

With reference to FIG. 28 and FIG. 29, when the server 401 has received the specification information request from the relay device 201A, the server 401 acquires, from the database in the storage 402, a topology specification table Stp2 and an application specification table Sap2 that correspond to "CN02" being the management number indicated by the received specification information request, and transmits the acquired topology specification table Stp2 and application specification table Sap2 to the relay device 201A.

The specification information acquisition unit 11 receives the topology specification table Stp2 and the application specification table Sap2 from the server 401 via the inspection port 22, and outputs the received topology specification table Stp2 and application specification table Sap2 to the comparison unit 13.

(Comparison Process)

Figure 30:
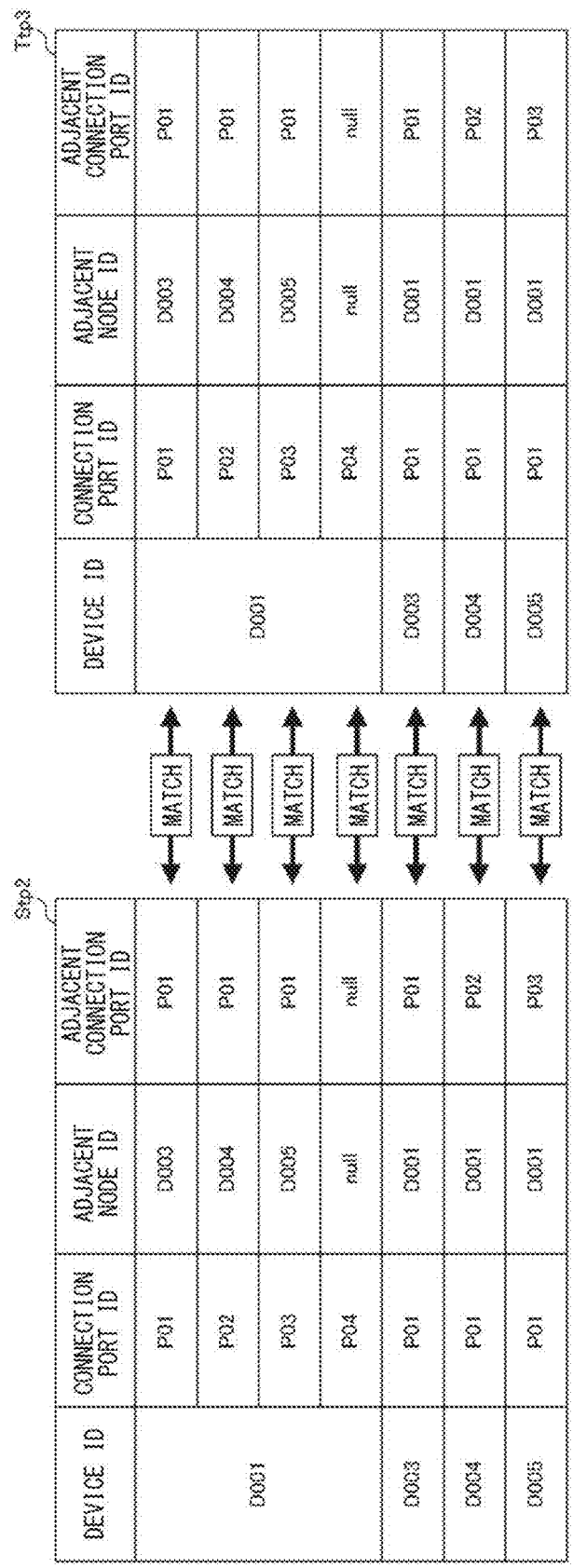
FIG. 30 shows another example of the comparison process by the comparison unit in the management unit according to the embodiment of the present disclosure.
Figure 31:
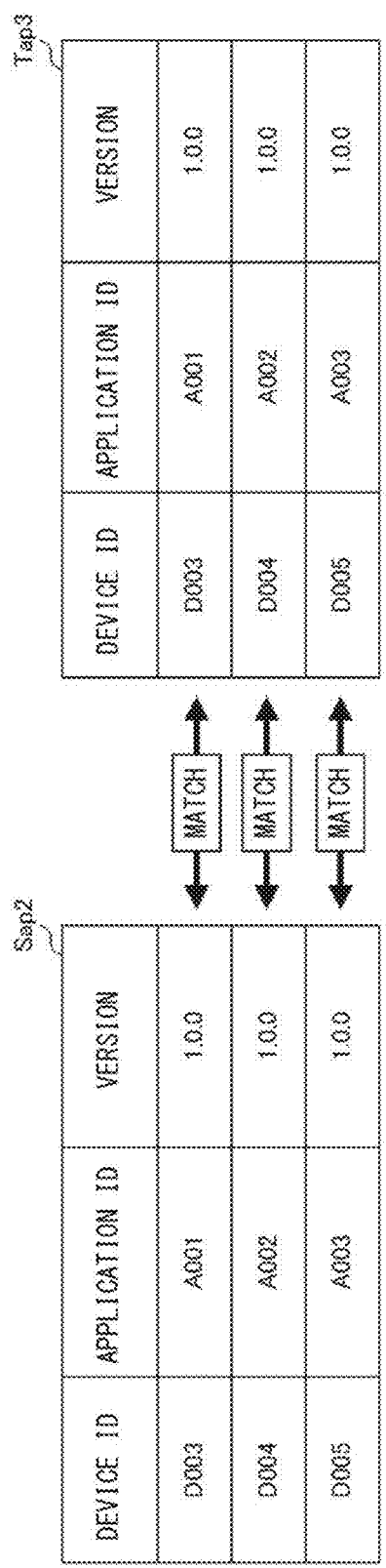
FIG. 31 shows another example of the comparison process by the comparison unit in the management unit according to the embodiment of the present disclosure.

FIG. 30 and FIG. 31 each show another example of the comparison process by the comparison unit in the management unit according to the embodiment of the present disclosure.

With reference to FIG. 30, the comparison unit 13 compares the topology specification table Stp2 received from the specification information acquisition unit 11 with the topology integration table Ttp3 received from the state information acquisition unit 12. Specifically, the comparison unit 13 checks the topology specification table Stp2 against the topology integration table Ttp3 for each row, and determines whether or not there is a match for each row.

With reference to FIG. 31, the comparison unit 13 compares the application specification table Sap2 received from the specification information acquisition unit 11 with the application integration table Tap3 received from the state information acquisition unit 12. Specifically, the comparison unit 13 checks the application specification table Sap2 against the application integration table Tap3 for each row, and determines whether or not there is a match for each row.

In the example shown in FIG. 30, the topology specification table Stp2 and the topology integration table Ttp3 match each other in all the rows. In the example shown in FIG. 31, the application specification table Sap2 and the application integration table Tap3 match each other in all the rows.

This indicates that the assembly state of the relay device 201 and the in-vehicle ECU 111 shown in FIG. 24 conforms to the specification of the assembly state of the relay device 201 and the in-vehicle ECU 111, i.e., the specification of the configuration of the in-vehicle network.

For example, as a result of the comparison process, the comparison unit 13 outputs, to the notification unit 14, a topology determination result indicating that the topology specification table Stp2 and the topology integration table Ttp3 match each other in all the rows, and an application determination result indicating that the application specification table Sap2 and the application integration table Tap3 match each other in all the rows.

The notification unit 14 receives the topology determination result and the application determination result from the comparison unit 13, and notifies the user, i.e., the manufacturer of the vehicle 1, of the received topology determination result and application determination result as an inspection result of the vehicle 1.

[Another Example of In-Vehicle System—3]

Figure 32:
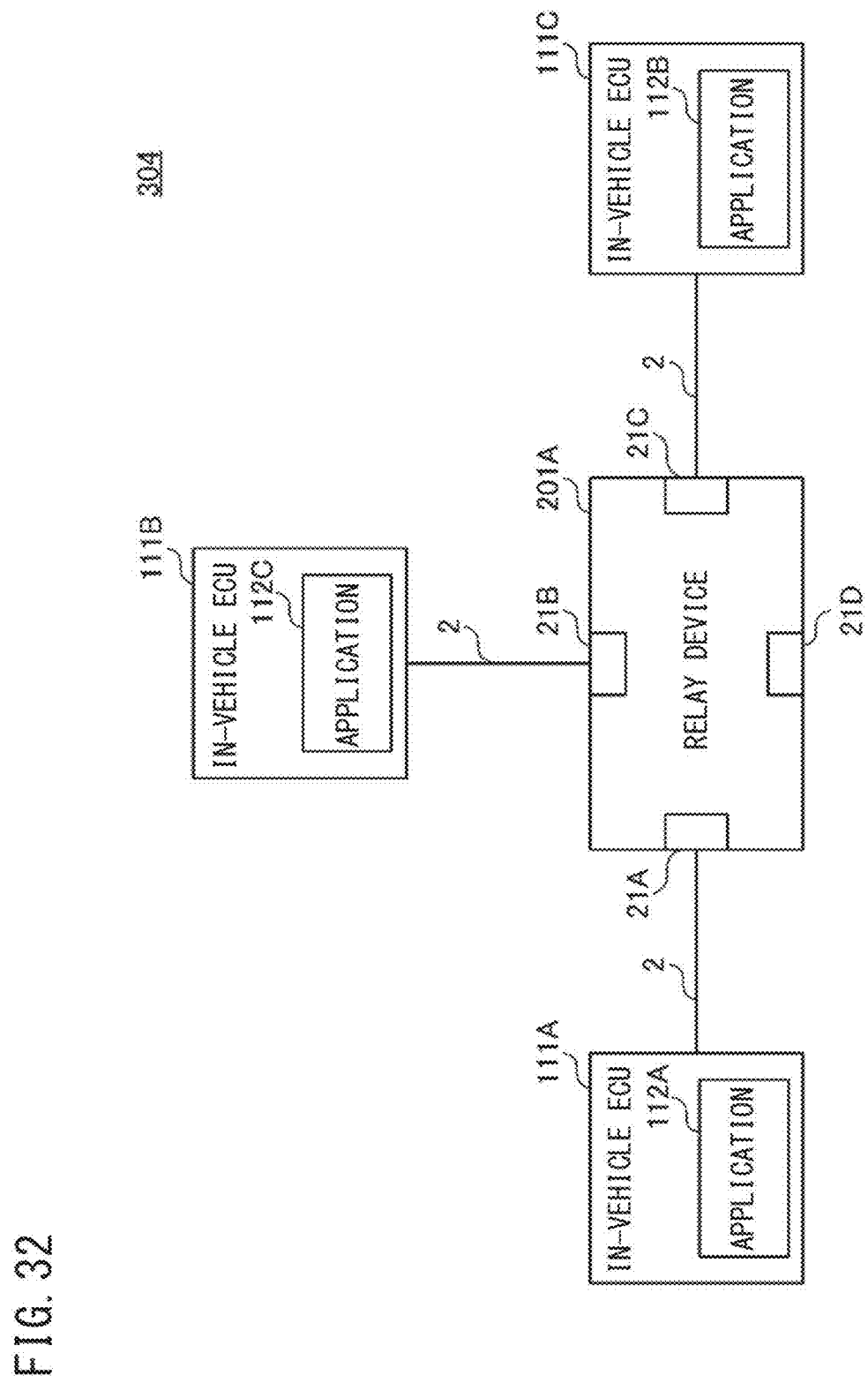
FIG. 32 shows another example of the configuration of the in-vehicle system according to the embodiment of the present disclosure.

FIG. 32 shows another example of the configuration of the in-vehicle system according to the embodiment of the present disclosure. FIG. 32 shows an in-vehicle system 304 manufactured by the relay device 201 and the in-vehicle ECU 111 being assembled into the vehicle 1 by the manufacturer of the vehicle 1.

With reference to FIG. 32, in the in-vehicle system 304, when compared with the in-vehicle system 303 shown in FIG. 24, the in-vehicle ECU 111B includes the application 112C instead of the application 112B, and the in-vehicle ECU 111C includes the application 112B instead of the application 112C.

(Creation of Topology Integration Table and Application Integration Table)

As described above, the state information acquisition unit 12 in the management unit 101 of the relay device 201A acquires the topology information table tp and the application information table ap from each in-vehicle device.

Figure 33:
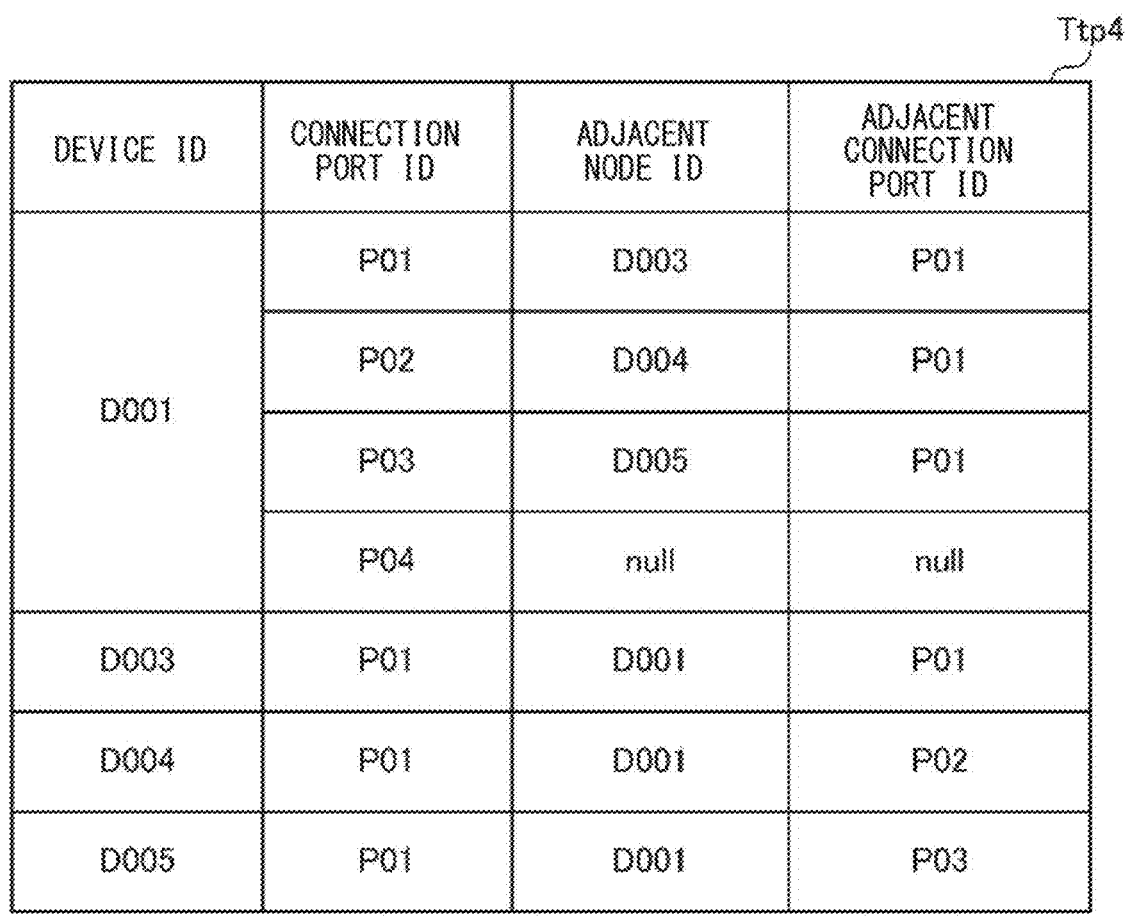
FIG. 33 shows another example of the topology integration table created by the state information acquisition unit in the management unit according to the embodiment of the present disclosure.

FIG. 33 shows another example of the topology integration table created by the state information acquisition unit in the management unit according to the embodiment of the present disclosure. FIG. 33 shows a topology integration table Ttp4 being the topology integration table Ttp showing the assembly state of the relay device 201 and the in-vehicle ECU 111 shown in FIG. 32. With reference to FIG. 33, the state information acquisition unit 12 acquires the topology information table tp from each in-vehicle device and integrates the acquired topology information tables tp, thereby creating the topology integration table Ttp4. The topology integration table Ttp4 is an example of the state information.

Figure 34:
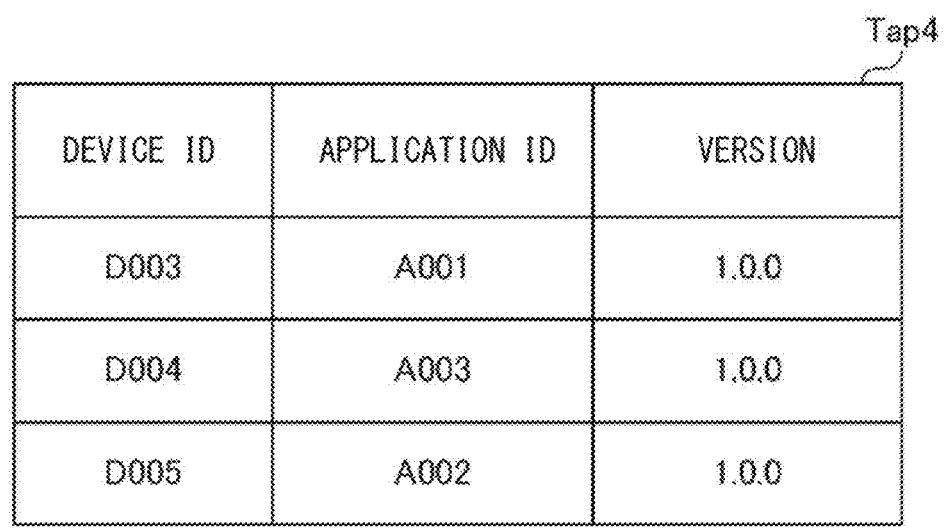
FIG. 34 shows another example of the application integration table created by the state information acquisition unit in the management unit according to the embodiment of the present disclosure.

FIG. 34 shows another example of the application integration table created by the state information acquisition unit in the management unit according to the embodiment of the present disclosure. FIG. 34 shows an application integration table Tap4 being the application integration table Tap showing the assembly state of the relay device 201 and the in-vehicle ECU 111 shown in FIG. 32. With reference to FIG. 34, the state information acquisition unit 12 acquires the application information table ap from each in-vehicle device and integrates the acquired application information tables ap, thereby creating the application integration table Tap4. The application integration table Tap4 is an example of the state information.

The state information acquisition unit 12 outputs the created topology integration table Ttp4 and application integration table Tap4 to the comparison unit 13.

(Acquisition of Topology Specification Table and Application Specification Table)

As described above, when the server 401 has been connected to the inspection port 22 through the cable by the manufacturer of the vehicle 1, the specification information acquisition unit 11 in the management unit 101 of the relay device 201A acquires the management number of "CN02" from the storage 24 and transmits a specification information request including the acquired management number to the server 401 via the inspection port 22.

Then, the specification information acquisition unit 11 receives the topology specification table Stp2 shown in FIG. 28 and the application specification table Sap2 shown in FIG. 29 from the server 401 via the inspection port 22, and outputs the received topology specification table Stp2 and application specification table Sap2 to the comparison unit 13.

(Comparison Process)

Figure 35:
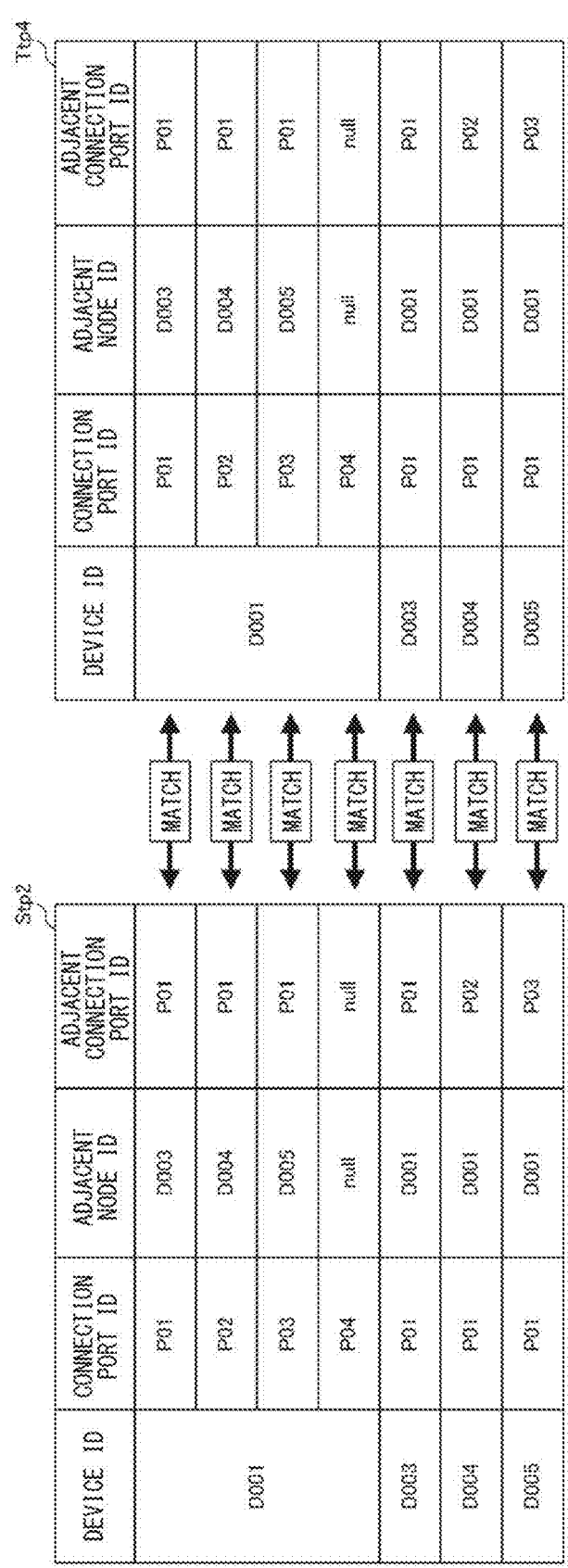
FIG. 35 shows another example of the comparison process by the comparison unit in the management unit according to the embodiment of the present disclosure.
Figure 36:
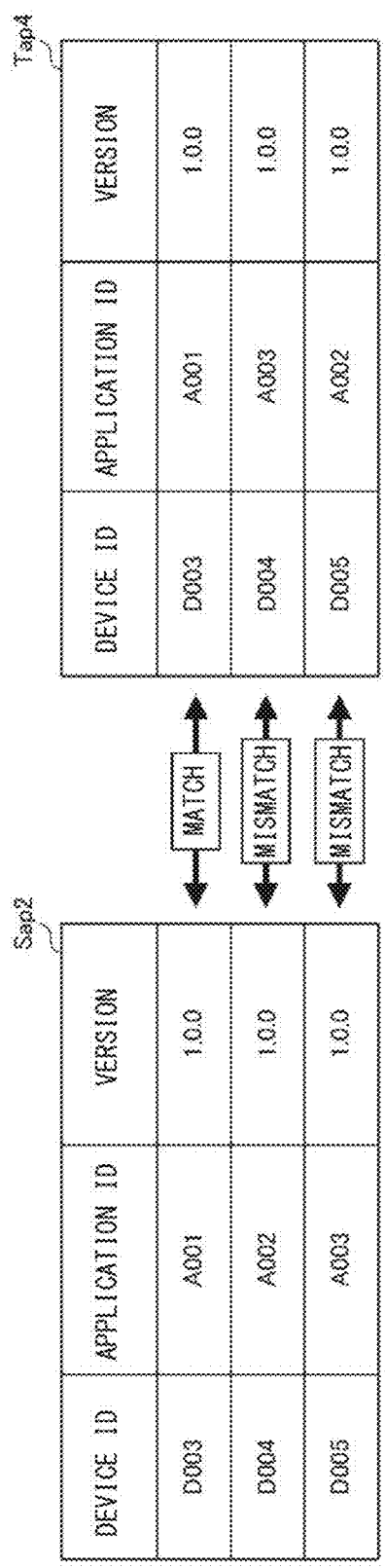
FIG. 36 shows another example of the comparison process by the comparison unit in the management unit according to the embodiment of the present disclosure.

FIG. 35 and FIG. 36 each show another example of the comparison process by the comparison unit in the management unit according to the embodiment of the present disclosure.

With reference to FIG. 35, the comparison unit 13 compares the topology specification table Stp2 received from the specification information acquisition unit 11 with the topology integration table Ttp4 received from the state information acquisition unit 12. Specifically, the comparison unit 13 checks the topology specification table Stp2 against the topology integration table Ttp4 for each row, and determines whether or not there is a match for each row.

With reference to FIG. 36, the comparison unit 13 compares the application specification table Sap2 received from the specification information acquisition unit 11 with the application integration table Tap4 received from the state information acquisition unit 12. Specifically, the comparison unit 13 checks the application specification table Sap2 against the application integration table Tap4 for each row, and determines whether or not there is a match for each row.

In the example shown in FIG. 35, the topology specification table Stp2 and the topology integration table Ttp4 match each other in all the rows. Meanwhile, in the example shown in FIG. 36, the application specification table Sap2 and the application integration table Tap4 do not match each other in some rows.

This indicates that the assembly state of the relay device 201 and the in-vehicle ECU 111 shown in FIG. 32 does not conform to the specification of the assembly state of the relay device 201 and the in-vehicle ECU 111, i.e., the specification of the configuration of the in-vehicle network. More specifically, it is indicated that the topology of the relay device 201 and the in-vehicle ECU 111 conforms to the specification of the configuration of the in-vehicle network, whereas an application 112 not conforming to the specification is included in some in-vehicle ECUs 111. Thus, in the management unit 101, when the topology of the in-vehicle devices conforms to the specification of the configuration of the in-vehicle network, whereas an application 112 not conforming to the specification is included in the in-vehicle devices, the fact that an application 112 not conforming to the specification is included in the in-vehicle devices can be detected.

For example, as a result of the comparison process, the comparison unit 13 outputs, to the notification unit 14, a topology determination result indicating that the topology specification table Stp2 and the topology integration table Ttp4 match each other in all the rows, and an application determination result indicating the rows that do not match each other in the application specification table Sap2 and the application integration table Tap4.

The notification unit 14 receives the topology determination result and the application determination result from the comparison unit 13, and notifies the user, i.e., the manufacturer of the vehicle 1, of the received topology determination result and application determination result as an inspection result of the vehicle 1.

For example, the notification unit 14 notifies the manufacturer of the vehicle 1 that the application 112 included in the in-vehicle device indicated by "device ID" in the row having a mismatch indicated by the application determination result is inappropriate. Specifically, the notification unit 14 notifies the manufacturer of the vehicle 1 that the application 112C included in the in-vehicle ECU 111B and the application 112B included in the in-vehicle ECU 111C are inappropriate.

[Operation Flow]

Each device in the inspection system according to the embodiment of the present disclosure includes a computer that includes a memory. An arithmetic processing unit such as a CPU in the computer reads out, from the memory, a program including a part or all of steps in the flowchart and sequence shown below, and executes the program. Programs for the plurality of devices can each be installed from outside. The programs for the plurality of devices are each distributed in a state of being stored in a storage medium or through a communication line.

Figure 37:
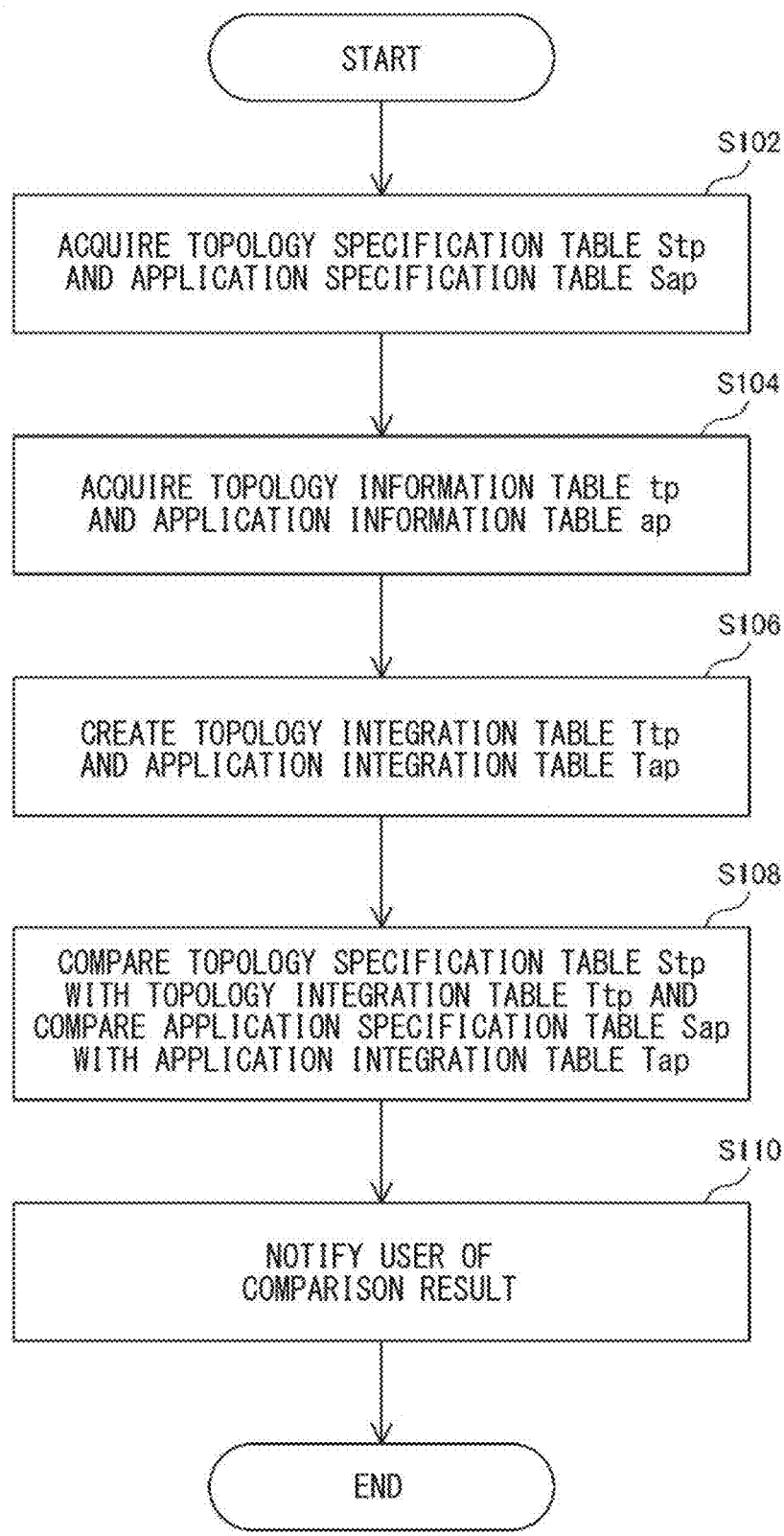
FIG. 37 is a flowchart describing an example of an operation procedure when the management unit according to the embodiment of the present disclosure performs the comparison process.

FIG. 37 is a flowchart describing an example of an operation procedure when the management unit according to the embodiment of the present disclosure performs the comparison process.

With reference to FIG. 37, first, the management unit 101 acquires, from the server 401, the topology specification table Stp and the application specification table Sap that correspond to the management number (step S102).

Next, the management unit 101 acquires the topology information table tp and the application information table ap from each of a plurality of in-vehicle devices (step S104).

Next, the management unit 101 integrates the acquired plurality of topology information tables tp, thereby creating the topology integration table Ttp, and integrates the acquired plurality of application information tables ap, thereby creating the application integration table Tap (step S106).

Next, the management unit 101 compares the topology specification table Stp with the topology integration table Ttp, and compares the application specification table Sap with the application integration table Tap (step S108).

Next, the management unit 101 performs the notification process of notifying the user of the comparison result (step S110).

The order of step S102, and steps S104, S106 above is not limited to the above, and the order may be switched.

Figure 38:
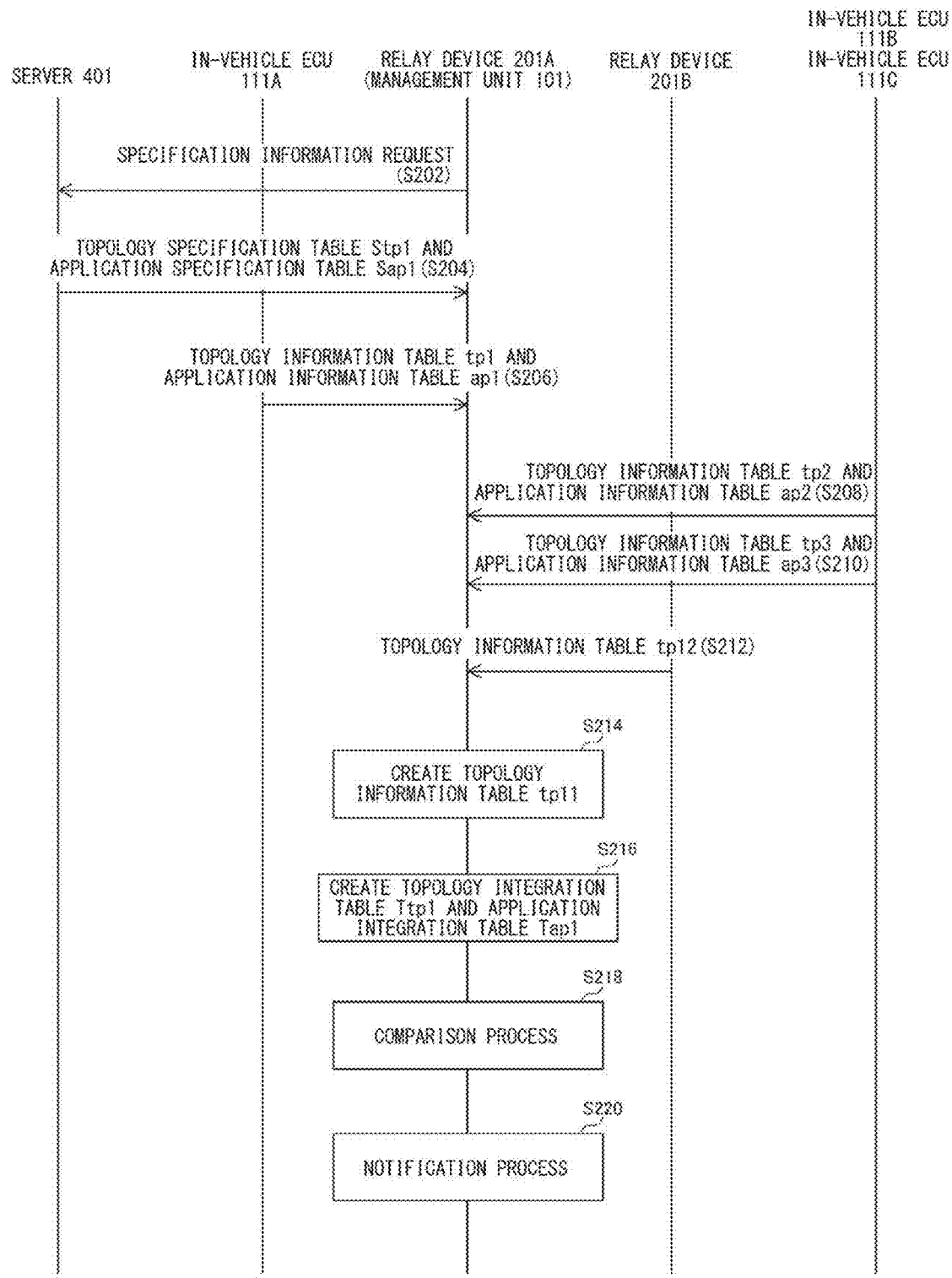
FIG. 38 shows an example of a sequence of inspection in the inspection system according to the embodiment of the present disclosure.

FIG. 38 shows an example of a sequence of inspection in the inspection system according to the embodiment of the present disclosure. FIG. 38 shows the sequence of inspection of the vehicle 1 in the in-vehicle system 301 shown in FIG. 2.

With reference to FIG. 38, first, for example, after completion of assembly of all the in-vehicle ECUs 111 and all the relay devices 201 in the in-vehicle system 301, the management unit 101 in the relay device 201A transmits a specification information request including a management number to the server 401 (step S202).

Next, the server 401 receives the specification information request, acquires, from the database in the storage 402, the topology specification table Stp1 and the application specification table Sap1 that correspond to the management number indicated by the received specification information request, and transmits the acquired topology specification table Stp1 and application specification table Sap1 to the relay device 201A (step S204).

Next, the in-vehicle ECU 111A creates the topology information table tp1 and the application information table ap1 and transmits the topology information table tp1 and the application information table ap1 to the relay device 201A (step S206).

The in-vehicle ECU 111B creates the topology information table tp2 and the application information table ap2 and transmits the topology information table tp2 and the application information table ap2 to the relay device 201A via the relay device 201B (step S208).

The in-vehicle ECU 111C creates the topology information table tp3 and the application information table ap3 and transmits the topology information table tp3 and the application information table ap3 to the relay device 201A via the relay device 201B (step S210).

The relay device 201B creates the topology information table tp12 and transmits the topology information table tp12 to the relay device 201A (step S212).

The relay device 201A creates the topology information table tp11 (step S214).

Next, the relay device 201A integrates the topology information tables tp1, tp2, tp3, tp11, tp12, thereby creating the topology integration table Ttp1, and integrates the application information tables ap1, ap2, ap3, thereby creating the application integration table Tap1 (step S216).

Next, the relay device 201A performs the comparison process of comparing the topology specification table Stp1 with the topology integration table Ttp1, and comparing the application specification table Sap1 with the application integration table Tap1 (step S218).

Next, the relay device 201A performs the notification process of notifying the comparison result to the user (step S220).

In the management unit 101 according to the embodiment of the present disclosure, the state information acquisition unit 12 creates the topology integration table Ttp and the application integration table Tap. However, the present disclosure is not limited thereto. The state information acquisition unit 12 may be configured not to create either one of the topology integration table Ttp and the application integration table Tap.

In the management unit 101 according to the embodiment of the present disclosure, the specification information acquisition unit 11 acquires, from the server 401, the topology specification table Stp and the application specification table Sap that correspond to the management number. However, the present disclosure is not limited thereto. For example, the specification information acquisition unit 11 may be configured to receive information indicating the topology specification table Stp and the application specification table Sap, from the manufacturer of the vehicle 1.

In the management unit 101 according to the embodiment of the present disclosure, the specification information acquisition unit 11 acquires, from the server 401, the topology specification table Stp and the application specification table Sap that correspond to the management number provided in advance before the management unit 101 is assembled into the vehicle 1. However, the present disclosure is not limited thereto. The specification information acquisition unit 11 may be configured to acquire, from the server 401, the topology specification table Stp and the application specification table Sap that correspond to the management number provided after the management unit 101 is assembled into the vehicle 1.

As an example, after completion of assembly of all the in-vehicle ECUs 111 and all the relay devices 201 in the in-vehicle system 301, the manufacturer of the vehicle 1 writes the management number into the storage 24 in the relay device 201A by using an inspection tool, for example. The manufacturer of the vehicle 1 connects the server 401 to the inspection port 22 in the relay device 201A through a cable and a WAN (which are not shown). When the server 401 has been connected to the inspection port 22 through the cable, the specification information acquisition unit 11 acquires the management number from the storage 24, and transmits a specification information request including the acquired management number to the server 401 via the inspection port 22, thereby acquiring, from the server 401, the topology specification table Stp and the application specification table Sap that correspond to the management number.

The management unit 101 according to the embodiment of the present disclosure includes the notification unit 14. However, the present disclosure is not limited thereto. The management unit 101 may be configured not to include the notification unit 14. In this case, for example, the comparison unit 13 saves the comparison result into the storage 24 in the relay device 201A. The manufacturer of the vehicle 1 reads out the comparison result from the storage 24, thereby being able to confirm whether or not the assembly state of the relay device 201 and the in-vehicle ECU 111 conforms to the specification of the configuration of the in-vehicle network.

In the management unit 101 according to the embodiment of the present disclosure, when the assembly state of the relay device 201 and the in-vehicle ECU 111 does not match the specification of the configuration of the in-vehicle network, the notification unit 14 performs the notification process that allows recognition of the in-vehicle device, among the relay device 201 and the in-vehicle ECU 111, in which the assembly state does not match the specification. However, the present disclosure is not limited thereto. For example, a configuration may be adopted in which, when the assembly state of some in-vehicle devices does not match the specification of the configuration of the in-vehicle network, the notification unit 14 does not perform notification that allows recognition of the in-vehicle devices in which the assembly state does not match the specification, and only performs notification that the assembly state of some in-vehicle devices does not match the specification.

The disclosed embodiments are merely illustrative in all aspects and should not be recognized as being restrictive. The scope of the present disclosure is defined by the scope of the claims rather than by the description above, and is intended to include meaning equivalent to the scope of the claims and all modifications within the scope.

The above description includes the features in the additional note below.

[Additional Note 1]

A management device including:

a specification information acquisition unit configured to acquire specification information indicating a specification of a configuration of an in-vehicle network;

a state information acquisition unit configured to acquire state information indicating an assembly state, in the in-vehicle network, of a plurality of in-vehicle devices forming the in-vehicle network; and a comparison unit configured to compare the specification indicated by the specification information acquired by the specification information acquisition unit with the assembly state indicated by the state information acquired by the state information acquisition unit, wherein the specification information acquisition unit, the state information acquisition unit, and the comparison unit are realized by a processor.

REFERENCE SIGNS LIST

1 vehicle
2 cable
11 specification information acquisition unit
12 state information acquisition unit
13 comparison unit
14 notification unit
21, 21A, 21B, 21C, 21D communication port
22 inspection port
23 relay unit
24 storage
101 management unit
111, 111A, 111B, 111C in-vehicle ECU
112, 112A, 112B, 112C application
201, 201A, 201B relay device
301, 302, 303, 304 in-vehicle system
401 server
402 storage
501 inspection system
tp, tp1, tp2, tp3, tp11, tp12 topology information table
ap, ap1, ap2, ap3 application information table
Stp, Stp1, Stp2 topology specification table
Sap, Sap1, Sap2 application specification table
Ttp, Ttp1, Ttp2, Ttp3, Ttp4 topology integration table
Tap, Tap1, Tap2, Tap3, Tap4 application integration table

The invention claimed is:

1. A management device comprising:
a controller having a processor and a memory with a computer readable program stored therein that upon execution of the computer readable program by the processor configures the controller to:
acquire specification information indicating a specification of a configuration of an in-vehicle network,
acquire state information indicating an assembly state, in the in-vehicle network, of a plurality of in-vehicle devices forming the in-vehicle network,
compare the specification indicated by the specification information with the assembly state indicated by the state information,
acquire an identifier indicating a configuration of an in-vehicle network that is determined in advance, and
acquire the specification information corresponding to the acquired identifier from a server outside the vehicle to which the management device is mounted.

2. The management device according to claim 1, wherein the controller is further configured to acquire, as the state information, topology information indicating a topology of each in-vehicle device in the in-vehicle network.

3. The management device according to claim 2, wherein the controller is further configured to acquire, as the state information, software information indicating a plurality of combinations of each in-vehicle device and software mounted to each in-vehicle device.

4. The management device according to claim 2, wherein the controller is further configured to perform a notification process of notifying a user of a comparison result between the specification and the assembly state.

5. The management device according to claim 4, wherein when the assembly state does not match the specification, the controller is configured to perform the notification process that allows recognition of at least one of the plurality of in-vehicle devices, in which the assembly state does not match the specification.

6. The management device according to claim 2, wherein the management device is included in a relay device configured to relay information between the plurality of in-vehicle devices via communication ports, and
the controller is configured to acquire the state information indicating the assembly state of a plurality of the in-vehicle devices connected to the relay device.

7. The management device according to claim 1, wherein the controller is further configured to acquire, as the state information, software information indicating a plurality of combinations of each in-vehicle device and software mounted to each in-vehicle.

8. The management device according to claim 7, wherein, the controller is further configured to:
acquire, as the specification information, software specification information indicating a specification of a plurality of combinations of each in-vehicle device and identification information of software mounted to each in-vehicle device, and
acquire, as the state information, the software information indicating a plurality of combinations of each in-vehicle device and identification information of software mounted to each in-vehicle device.

9. The management device according to claim 8, wherein the controller is further configured to perform a notification process of notifying a user of a comparison result between the specification and the assembly state.

10. The management device according to claim 9, wherein
when the assembly state does not match the specification, the controller is configured to perform the notification process that allows recognition of at least one of the plurality of in-vehicle devices, in which the assembly state does not match the specification.

11. The management device according to claim 7, wherein the controller is further configured to perform a notification process of notifying a user of a comparison result between the specification and the assembly state.

12. The management device according to claim 11, wherein
when the assembly state does not match the specification, the controller is configured to perform the notification process that allows recognition of at least one of the plurality of in-vehicle devices, in which the assembly state does not match the specification.

13. The management device according to claim 1, wherein
the controller is further configured to:
perform a notification process of notifying a user of a comparison result between the specification and the assembly state.

14. The management device according to claim 13, wherein
when the assembly state does not match the specification, the controller is configured to perform the notification process that allows recognition of at least one of the plurality of in-vehicle devices, in which the assembly state does not match the specification.

15. The management device according to claim 1, wherein
the management device is included in a relay device configured to relay information between the plurality of in-vehicle devices via communication ports, and
the controller is configured to acquire the state information indicating the assembly state of a plurality of the in-vehicle devices connected to the relay device.

16. The management device according to claim 1, wherein
when having determined that the assembly state does not conform to the specification, the controller is configured to acquire setting information corresponding to the state information and for performing a relay process of relaying information between the plurality of in-vehicle devices, and
the controller is further configured to transmit the acquired setting information to a relay device that performs the relay process.

17. An inspection method for a vehicle to be performed in a management device, the inspection method comprising:
a step of acquiring specification information indicating a specification of a configuration of an in-vehicle network;
a step of acquiring state information indicating an assembly state, in the in-vehicle network, of a plurality of in-vehicle devices forming the in-vehicle network; and
a step of comparing the specification indicated by the acquired specification information with the assembly state indicated by the acquired state information, wherein
in the step of acquiring the specification information, an identifier indicating a configuration of an in-vehicle network that is determined in advance, and the specification information corresponding to the acquired identifier is acquired from a server outside the vehicle to which the management device is mounted.

18. The inspection method according to claim 17, wherein the inspection method further comprises:
a step of, when the assembly state has been determined not to conform to the specification in the step of comparing the specification indicated by the specification information with the assembly state indicated by the state information, acquiring setting information corresponding to the state information and for performing a relay process of relaying information between the plurality of in-vehicle devices; and
a step of transmitting the acquired setting information to a relay device that performs the relay process.

19. A non-transitory computer-readable storage medium having, stored therein, an inspection program to be used in a management device, the inspection program causing a computer to perform a method comprising:
acquiring specification information indicating a specification of a configuration of an in-vehicle network;
acquiring state information indicating an assembly state, in the in-vehicle network, of a plurality of in-vehicle devices forming the in-vehicle network;
comparing the specification indicated by the specification information with the assembly state indicated by the state information;
acquiring an identifier indicating a configuration of an in-vehicle network that is determined in advance; and acquiring the specification information corresponding to the acquired identifier from a server outside the vehicle to which the management device is mounted.

20. The non-transitory computer-readable storage medium according to claim 19, wherein the method further comprises:
when having determined that the assembly state does not conform to the specification, acquiring setting information corresponding to the state information and for performing a relay process of relaying information between the plurality of in-vehicle devices; and
transmitting the acquired setting information to a relay device that performs the relay process.

\* \* \* \* \*